US011179963B2

(12) United States Patent
Ito

(10) Patent No.: US 11,179,963 B2
(45) Date of Patent: Nov. 23, 2021

(54) WRITING INSTRUMENT

(71) Applicants: THE PILOT INK CO., LTD., Aichi (JP); KABUSHIKI KAISHA PILOT CORPORATION, Tokyo (JP)

(72) Inventor: Yoshihiro Ito, Aichi (JP)

(73) Assignees: THE PILOT INK CO., LTD., Nagoya (JP); KABUSHIKI KAISHA PILOT CORPORATION, Tokyo (JP)

(*) Notice: Subject to any disclaimer, the term of this patent is extended or adjusted under 35 U.S.C. 154(b) by 112 days.

(21) Appl. No.: 16/658,433

(22) Filed: Oct. 21, 2019

(65) Prior Publication Data
US 2020/0047540 A1 Feb. 13, 2020

Related U.S. Application Data

(63) Continuation of application No. 15/830,456, filed on Dec. 4, 2017, now Pat. No. 10,493,791, which is a (Continued)

(30) Foreign Application Priority Data

Feb. 3, 2010 (JP) ................ 2010-022530
May 26, 2010 (JP) ................ 2010-121032
(Continued)

(51) Int. Cl.
*B43K 25/02* (2006.01)
*C09D 11/16* (2014.01)
(Continued)

(52) U.S. Cl.
CPC ............ *B43K 25/024* (2013.01); *B43K 7/005* (2013.01); *B43K 7/02* (2013.01); *B43K 7/08* (2013.01);
(Continued)

(58) Field of Classification Search
CPC .... B43K 23/008; B43K 24/04; B43K 25/028; B43K 29/02; B43K 25/024; B43K 7/005;
(Continued)

(56) References Cited

U.S. PATENT DOCUMENTS 2,427,068 A 9/1947 Randolph
2,483,329 A 9/1949 Wahl
(Continued)

FOREIGN PATENT DOCUMENTS

CN 1960884 A 5/2007
DE 387264 C 12/1923
(Continued)

OTHER PUBLICATIONS

Japanese Office Action for Japanese Patent Application No. 2010-145649, dated Apr. 30, 2014, 9 pages.
(Continued)

*Primary Examiner* — David J Walczak
(74) *Attorney, Agent, or Firm* — Westman, Champlin & Koehler, P.A.

(57) ABSTRACT

A thermochromic writing instrument including a writing body, storing a thermochromic ink therein, stored in a barrel; an operation body provided in the barrel to be operated to longitudinally move the writing body; a nib of the writing body configured to be capable of appearing from a front end of the writing instrument, wherein the writing instrument 1 further includes a friction unit, for rubbing handwriting in the thermochromic ink and capable of thermally changing the color of the handwriting by frictional heat generated at that time, and at least one clip body as the operation body, the friction unit 10 is provided at a rear end of the barrel, and the clip body is provided in an area other than the rear end of the barrel.

4 Claims, 29 Drawing Sheets

Related U.S. Application Data continuation of application No. 14/794,929, filed on Jul. 9, 2015, now Pat. No. 9,844,973, which is a continuation of application No. 13/576,826, filed as application No. PCT/JP2011/051905 on Jan. 31, 2011, now Pat. No. 9,108,456.

(30) Foreign Application Priority Data

| Jun. 25, 2010 | (JP) | 2010-145648 |
| Jun. 25, 2010 | (JP) | 2010-145649 |
| Jun. 25, 2010 | (JP) | 2010-145650 |

(51) Int. Cl.

| B43K 7/02 | (2006.01) |
| B43K 7/08 | (2006.01) |
| B43K 7/12 | (2006.01) |
| B43K 15/00 | (2006.01) |
| B43K 23/008 | (2006.01) |
| B43K 24/04 | (2006.01) |
| B43K 29/02 | (2006.01) |
| B43K 29/00 | (2006.01) |
| B43K 7/00 | (2006.01) |
| C09D 11/17 | (2014.01) |

(52) U.S. Cl.
CPC ............... *B43K 7/12* (2013.01); *B43K 15/00* (2013.01); *B43K 23/008* (2013.01); *B43K 24/04* (2013.01); *B43K 25/028* (2013.01); *B43K 29/02* (2013.01); *C09D 11/16* (2013.01); *C09D 11/17* (2013.01)

(58) Field of Classification Search
CPC . B43K 7/002; B43K 7/08; B43K 7/12; B43K 15/00; C09D 11/16; C09D 11/17
USPC .......... 401/198, 199, 52, 109–112, 195, 131, 401/104–106
See application file for complete search history.

(56) References Cited

U.S. PATENT DOCUMENTS

| 3,203,402 | A | 8/1965 | Lockwood |
| 3,637,316 | A | 1/1972 | Bross |
| 3,741,665 | A | 6/1973 | Smagala-Romanoff |
| 5,011,445 | A | 4/1991 | Nakasuji et al. |
| 5,413,428 | A | 5/1995 | Kageyama |
| 7,147,392 | B2 | 12/2006 | Bedhome et al. |
| 7,350,996 | B2 | 4/2008 | Bielecki et al. |
| 8,096,722 | B2 | 1/2012 | Rolion et al. |
| 8,104,983 | B2 | 1/2012 | Bedhome et al. |
| 8,322,937 | B2 | 12/2012 | Imamura et al. |
| 9,266,379 | B2 | 2/2016 | Imamura et al. |
| 2001/0005467 | A1 | 6/2001 | Lin |
| 2005/0100388 | A1 | 5/2005 | Bedhome et al. |
| 2006/0216103 | A1 | 9/2006 | Bielecki et al. |
| 2007/0223986 | A1 | 9/2007 | Rolion et al. |
| 2010/0047004 | A1 | 2/2010 | Bedhome et al. |

FOREIGN PATENT DOCUMENTS

| DE | 2160618 A1 | 6/1973 |
| DE | 10014689 A1 | 6/2001 |
| EP | 0 630 762 A1 | 12/1994 |
| EP | 1 066 984 A1 | 1/2001 |
| EP | 2 072 277 A1 | 6/2006 |
| EP | 1 820 662 A2 | 8/2007 |
| EP | 1 939 259 A2 | 7/2008 |
| EP | 1 995 076 A1 | 11/2008 |
| EP | 2078616 A2 | 7/2009 |
| EP | 2 130 684 A1 | 12/2009 |
| FR | 1 159 302 A | 6/1958 |
| GB | 1 192 116 A | 5/1970 |
| JP | 53-147941 | 11/1978 |
| JP | 57-179986 U | 11/1982 |
| JP | 3-81792 U | 8/1991 |
| JP | 6-28311 Y2 | 8/1994 |
| JP | 2003-305990 A | 10/2003 |
| JP | 2006123278 A | 5/2006 |
| JP | 2007-055156 A | 3/2007 |
| JP | 2007-253487 A | 10/2007 |
| JP | 2008-534331 A | 8/2008 |
| JP | 2009179066 A | 8/2009 |
| WO | 2006/070962 A1 | 7/2006 |
| WO | 2008/105227 A1 | 9/2008 |
| WO | 2009/107855 A1 | 9/2009 |

OTHER PUBLICATIONS

Japanese Office Action for Japanese Patent Application No. 2010-145650, dated Apr. 30, 2014, 26 pages.
Japanese Office Action for Japanese Patent Application No. 2010-145648, dated Apr. 30, 2014, 4 pages.
Chinese Office Action for Chinese Patent Application No. 2011800084290.9, dated Mar. 31, 2014, 10 pages.
Notification of Transmittal of Translation of International Preliminary Report on Patentability and International Preliminary Report on Patentability for PCT Application No. PCT/JP2011/051905, dated Sep. 27, 2012, 2 pages.
English translation of Written Opinion for PCT Application No. PCT/JP2011/051905, dated Feb. 2, 2011, 22 pages.
International Search Report and Written Opinion for PCT Application No. PCT/JP2011/051905, dated Feb. 22, 2011, 22 pages.
Extended European Search Report for European Patent Application No. 11739705.9-1704, dated Sep. 13, 2013, 7 pages.
Extended European Search Report for European Patent Application No. 13183588.6-1704/2676804, dated Apr. 16, 2014, 9 pages.
Extended European Search Report for European Patent Application No. 13183586.0-1704/2676805, dated May 20, 2014, 3 pages.
Prosecution history from U.S. Appl. No. 13/576,826, filed Aug. 2, 2012, including Non-Final Rejection dated Dec. 23, 2014 and Notice of Allowance dated Apr. 10, 2015, 16 pages total.
European Search Report for European Patent Application No. 17155130.2-1704, dated May 3, 2017, 10 pages.
Prosecution history from U.S. Appl. No. 14/794,929, filed Jul. 9, 2015, including Notice of Allowance and Fees Due (PTOL-85) dated Sep. 6, 2017, 5 pages; and Non-Final Rejection dated Mar. 28, 2017, 11 pages; 16 pages total.
Japanese Office Action for Japanese Patent Application No. 2017-183249, dated Sep. 25, 2018, 7 pages.
Prosecution history from U.S. Appl. No. 15/830,456, filed Dec. 4, 2017, including: Notice of Allowance dated Jul. 22, 2019, 7 pages; and Non-Final Rejection dated Jan. 31, 2019, 11 pages; 18 page total.
Office Action, for corresponding Indian Patent Application No. 201918028129, dated Jan. 29, 2021, 6 pages.
Office Action, for corresponding Indian Patent Application No. 201918028130, dated Jan. 29, 2021, 5 pages.

WRITING INSTRUMENT

CROSS-REFERENCE TO RELATED APPLICATIONS

This Application is a continuation of U.S. application Ser. No. 15/830,456, filed on Dec. 4, 2017, which issued as U.S. Pat. No. 10,493,791, on Dec. 3, 2019, which was a continuation of U.S. application Ser. No. 14/794,929, filed on 9 Jul. 2015, which issued on 19 Dec. 2017, as U.S. Pat. No. 9,844,973, which was a continuation of U.S. application Ser. No. 13/576,826, filed on 2 Aug. 2012, which issued as U.S. Pat. No. 9,108,456 on 18 Aug. 2015, which is a Section 371 National Stage Application of International Application No. PCT/JP2011/051905, filed Jan. 31, 2011 and published as WO 2011/096357 A1 on Aug. 11, 2011, in Japanese, the contents of which are hereby incorporated by reference in their entirety.

TECHNICAL FIELD

The present invention relates to a writing instrument. Specifically, it relates to a thermochromic writing instrument having a writing body storing a thermochromic ink therein, having a front end of the writing body provided with a nib capable of ejecting the thermochromic ink, storing the writing body longitudinally movably in a barrel, and configuring the nib of the writing body capable of appearing from a front end hole of the barrel.

BACKGROUND ART

Patent Document 1 discloses a thermochromic writing instrument storing a writing body longitudinally movably in a barrel, provided with an operation unit on an outer surface of the barrel, configuring a nib of the writing body capable of appearing from a front end hole of the barrel by operating the operation unit, storing a thermochromic ink inside the writing body, provided with a nib capable of ejecting the thermochromic ink at a front end of the writing body, and provided with a friction unit, on an outer surface of the barrel, rubbing handwriting in the thermochromic ink and capable of thermally changing the color of the handwriting by frictional heat generated at that time.

In Patent Document 1 above, in a case of providing a friction unit in an operation unit at a rear end of the barrel in a type to push the operation unit forward, when friction operating using the friction unit, there is a risk of moving the operation unit forward by a written surface and thus not allowing a stable friction operation. In particular, when adopting an appearance mechanism of a type of push operating the operation unit forward (so-called double knock type) for both a nib projection operation and a nib retraction operation and also providing the friction unit in the operation unit, there is a risk of longitudinally shaking an operation body in a nib projection condition and thus not allowing a stable friction operation.

FIG. 12 in Patent Document 1 discloses a configuration provided with a tubular operation unit longitudinally movably, provided with a projected clip, capable of sandwiching a pocket or the like, on an outer surface of the tubular operation unit, and provided with a friction unit on an outer surface at the rear end of the tubular operation unit. However, since a thermochromic writing instrument of this configuration pushes the friction unit at the time of a nib appearance operation, there is a risk of contaminating the friction unit with hand grime and the like. Then, in a case of rubbing handwriting in a thermochromic ink with the friction unit in a contaminated condition, there is a risk of contaminating the written surface (for example, paper surface) having the handwriting.

FIG. 15 in Patent Document 1 discloses a configuration provided with an appearance mechanism of a configuration to put from a nib retraction condition into a nib projection condition (so-called side sliding multi-cartridge type) by having an operation unit projected radially outward from a side wall of a barrel and by push operating the operation unit forward against a backward bias, and provided with a friction unit on an outer surface at a rear end of the barrel. However, in a thermochromic writing instrument of this configuration, when putting from a nib projection condition into a nib retraction condition (when releasing the nib projection condition), an operation body attached to another writing body has to be operated. Therefore, a plurality of operation bodies (that is, a plurality of projections) is required to be provided, and the degree of freedom for appearance design is reduced. Further, when the barrel is provided with a clip capable of sandwiching a pocket or the like, projections increase even more and the degree of freedom for appearance design is reduced.

Patent Document 1: WO 2008/105227 publication

DISCLOSURE OF THE INVENTION

The present invention is to solve the conventional problems and it is an object of the present invention to provide a thermochromic writing instrument enabling a stable friction operation using a friction unit, and further possible to avoid contaminating the friction unit with hand grime and the like, and moreover increasing the degree of freedom for appearance design.

In addition to above, it is an object of the present invention to provide a thermochromic writing instrument exhibiting the following actions and effects:

(1) a user can easily learn an operation method, and the operation method is simple;

(2) a clip body can easily be inserted into a slide hole;

(3) the entire barrel can be avoided to become unnecessarily long;

(4) even when gripping near the clip body in a nib projection condition, a stable friction operation is possible;

(5) as a sandwiching performance of the clip body improves, a wobble of the clip body can be prevented; and (6) when putting from a nib projection condition into a nib retraction condition, the impact applied to a writing body can be alleviated.

To achieve the above objects, a thermochromic writing instrument according to an embodiment of the present invention is configured with: a writing body, storing a thermochromic ink therein, stored in a barrel; an operation body provided in the barrel to be operated to longitudinally move the writing body; a nib of the writing body configured to be capable of appearing from a front end of the writing instrument, wherein the writing instrument further includes a friction unit, rubbing handwriting in the thermochromic ink and capable of thermally changing the color of the handwriting by frictional heat generated at that time, and at least one clip body as the operation body, the friction unit is provided at a rear end of the barrel, and the clip body is provided in an area other than the rear end of the barrel.

In addition, to achieve the above objects, a writing instrument according to another embodiment of the present invention is configured with: a writing body stored in a barrel; an operation body provided in the barrel to be operated to longitudinally move the writing body; and a nib of the writing body configured to be capable of appearing from a front end of a writing instrument, wherein the writing instrument further includes at least one clip body as the operation body, a longitudinally extending slide hole provided in a side wall of the barrel, and an appearance mechanism putting the nib of the writing body from a retraction condition into a projection condition by slide operating the clip body placed in the slide hole forward, and the barrel includes a plurality of components capable of being coupled to each other, a first or second long hole longitudinally extending and opened forward or backward is provided respectively on respective side walls of two of the components configuring the barrel, and when coupling the two components, the first and second long holes form the slide hole in communication with each other.

Further, to achieve the above objects, a writing instrument according to still another embodiment of the present invention is configured with: a writing body stored in a barrel; an operation body provided in the barrel to be operated to longitudinally move the writing body; and a nib of the writing body configured to be capable of appearing from a front end of a writing instrument, wherein the writing instrument further includes a longitudinally extending slide hole provided in a side wall of the barrel and an appearance mechanism putting the nib of the writing body from a retraction condition into a projection condition by slide operating the operation body placed in the slide hole forward, the barrel includes therein, as the appearance mechanism, a plurality of longitudinally extending cam teeth and cam grooves alternately placed along a circumferential direction, a rotary member having a plurality of projected ribs rotatably placed in a rear of the writing body and capable of alternately engaging with the cam teeth or the cam grooves, another plurality of cam teeth provided in the operation body and turning the rotary member, and an biasing member biasing the writing body backward, the operation body is provided with a longitudinally extending stem stored in the barrel, and the stem and the rotary member are locked to each other in a condition having longitudinal allowance, and by slide operating the operation body forward against a biasing force of the biasing member, the projected ribs are alternately engaged with the cam teeth or the cam grooves at longitudinally different positions to alternately put the nib of the writing body in the projection condition or the retraction condition.

Herein, "front" means a nib side, and "rear" means the other side. In addition, herein, "a nib retraction condition" means a condition of a nib retracted into a barrel, and "a nib projection condition" means a condition of a nib projecting outward from a front end of the barrel. Still herein, "a nib retraction operation" means an operation of putting from a nib projection condition into a nib retraction condition, and "a nib projection operation" means an operation of putting from a nib retraction condition into a nib projection condition.

DETAILED DESCRIPTION OF THE INVENTION

Overall Description

Figure 1:
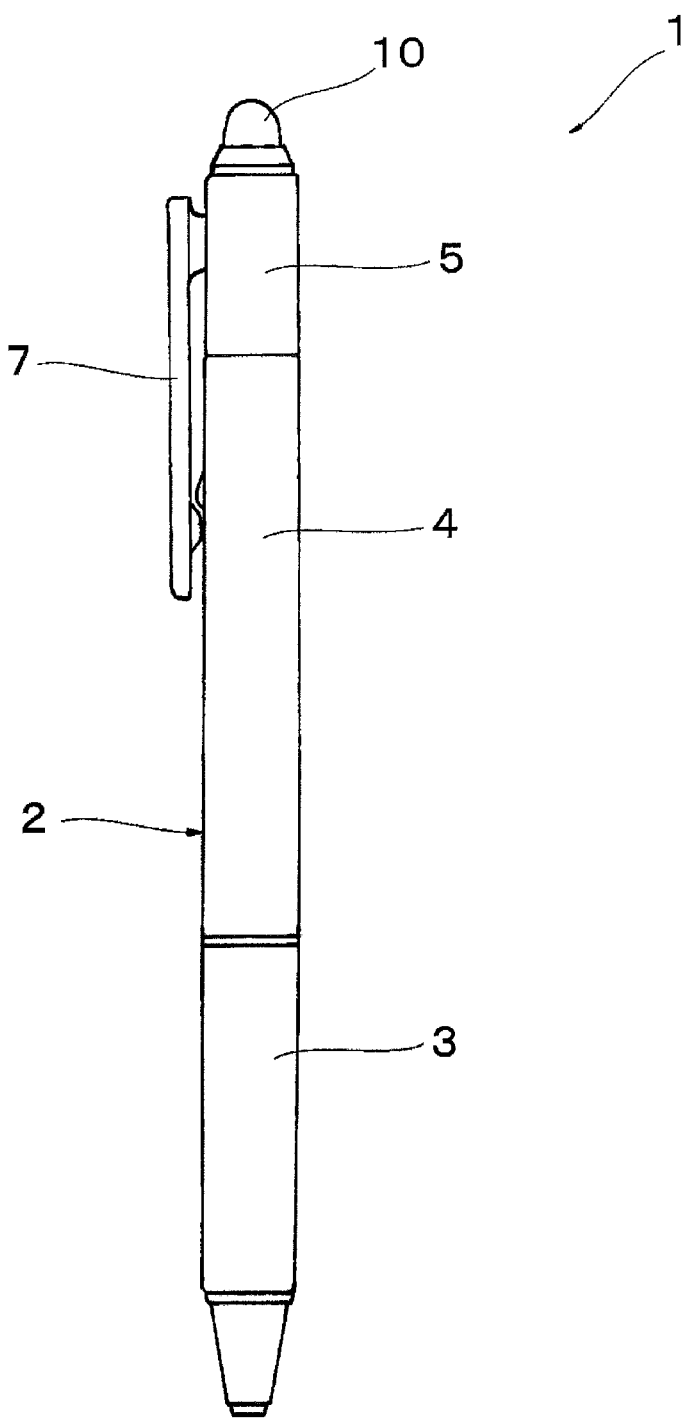
FIG. 1 is a side view illustrating a nib retraction condition in First Embodiment of the present invention.
Figure 2:
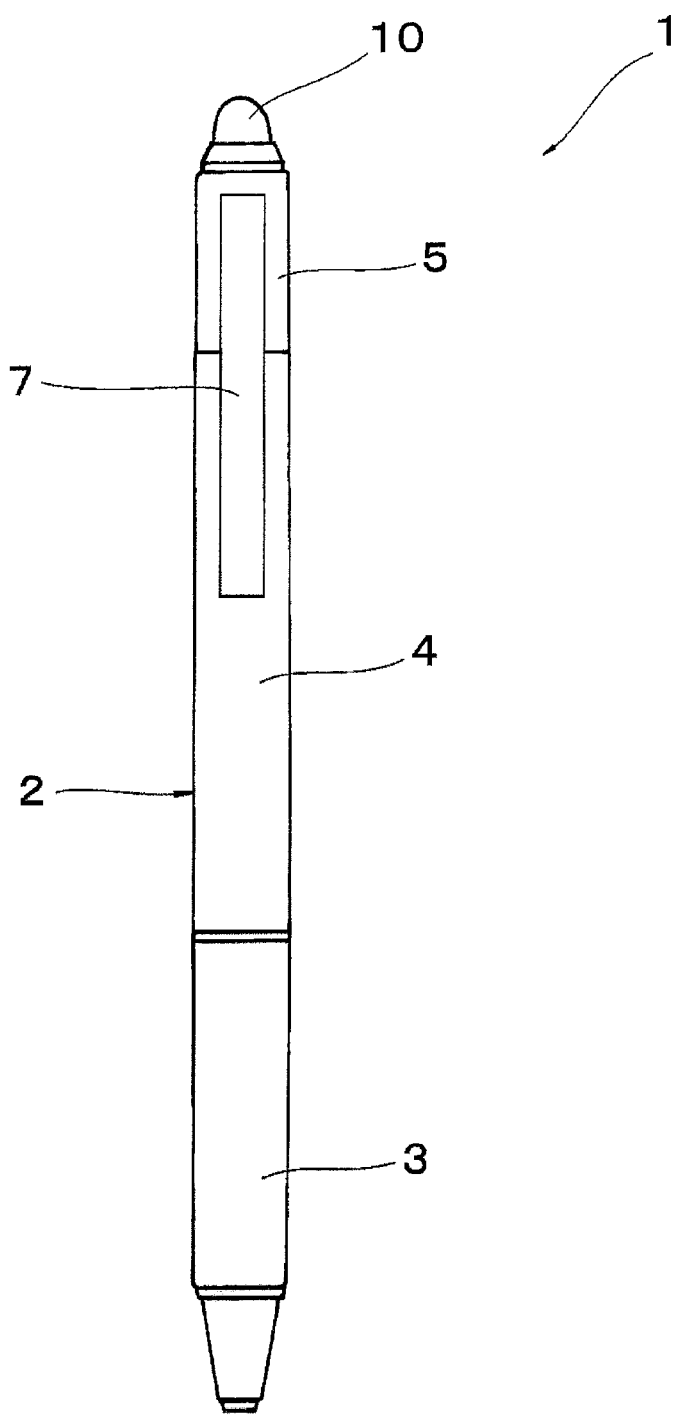
FIG. 2 is a front view of FIG. 1.
Figure 3:
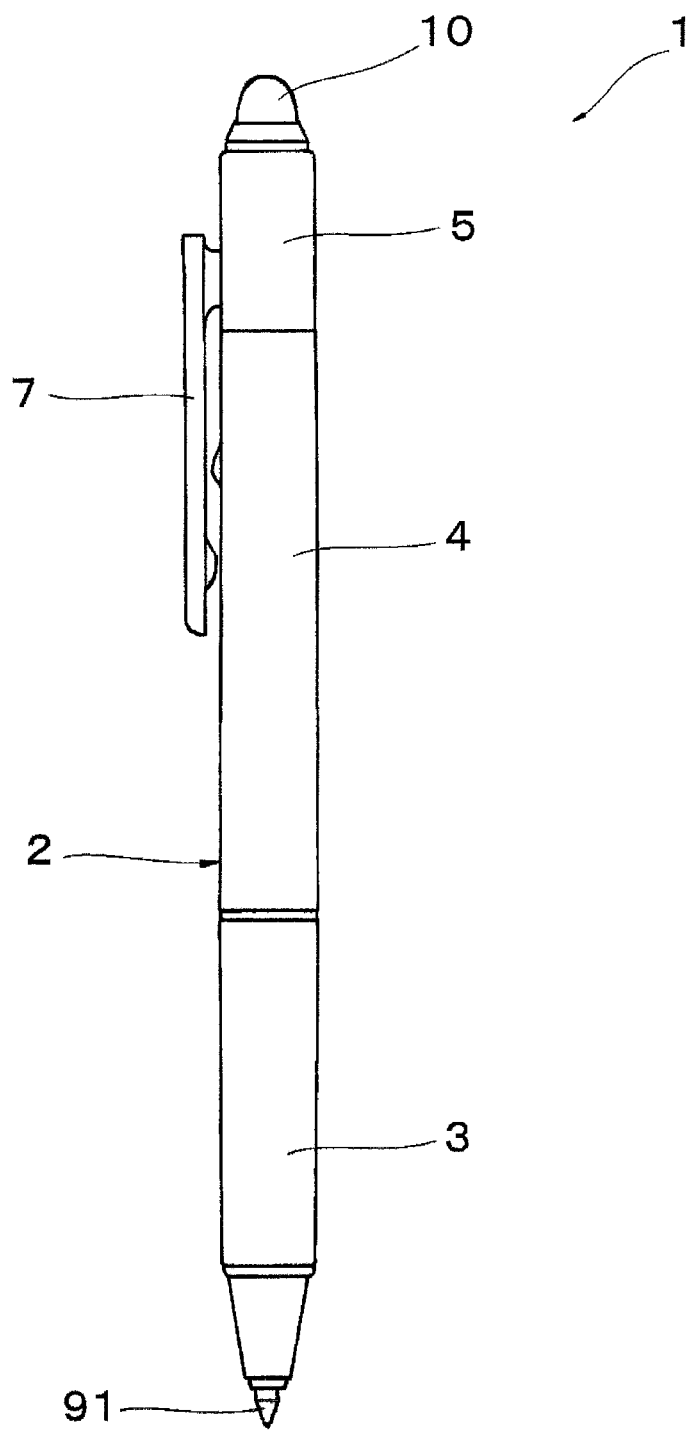
FIG. 3 is a side view illustrating a nib projection condition of FIG. 1.
Figure 4:
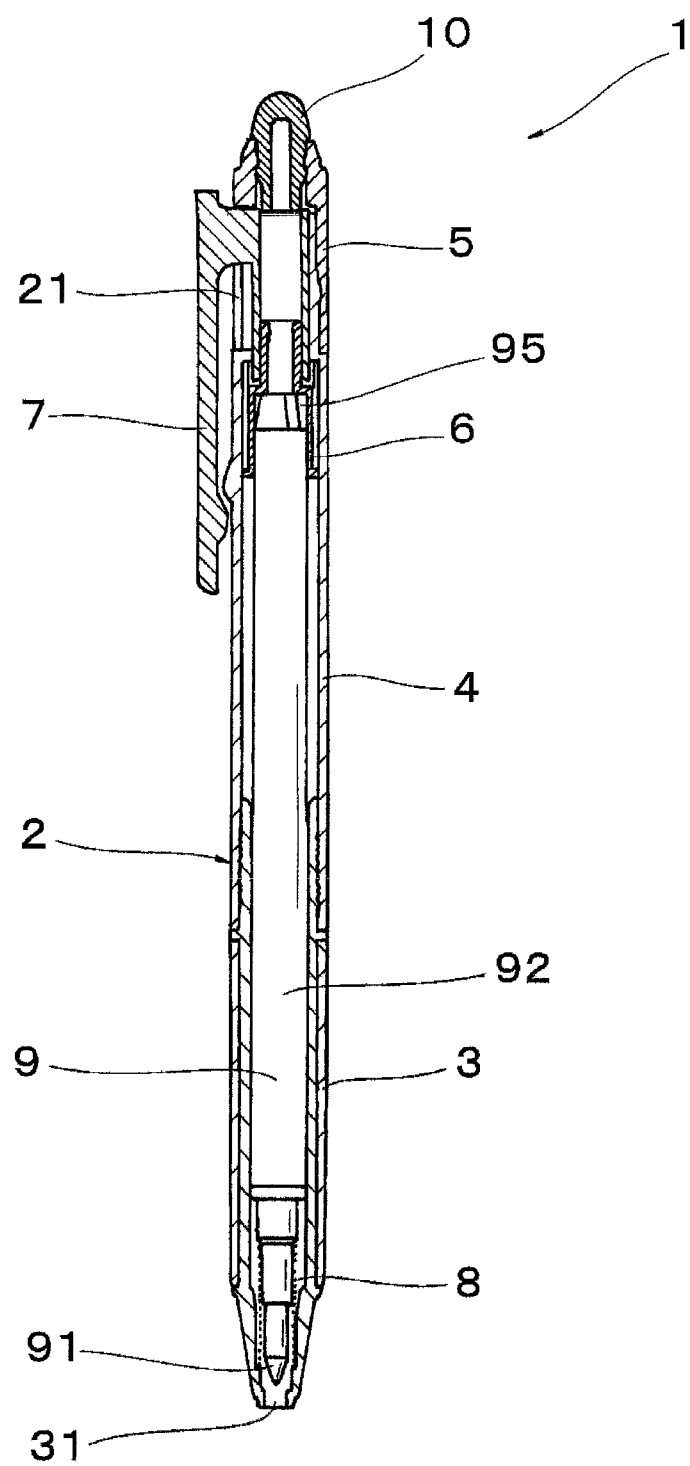
FIG. 4 is a longitudinal sectional view of FIG. 1.

To achieve the above objects, a thermochromic writing instrument according to an embodiment of the present invention is configured with: a writing body, storing a thermochromic ink therein, stored in a barrel; an operation body provided in the barrel to be operated to longitudinally move the writing body; a nib of the writing body configured to be capable of appearing from a front end of the writing instrument, wherein the writing instrument further includes a friction unit, rubbing handwriting in the thermochromic ink and capable of thermally changing the color of the handwriting by frictional heat generated at that time, and at least one clip body as the operation body, the friction unit is provided at a rear end of the barrel, and the clip body is provided in an area other than the rear end of the barrel.

According to the above configuration, the friction unit is provided at the rear end of the barrel independently of the clip body (operation body), so that the friction unit does not move forward during a friction operation, and the friction operation using the friction unit becomes stable. In addition, since it is not required to touch the friction unit during a nib appearance operation, it is possible to avoid contamination of the friction unit with hand grime and the like.

It is preferred to configure the thermochromic writing instrument of the present invention such that the writing instrument includes only a single of the clip body as the operation body, and by operating the single clip body, the nib of the writing body is enabled to be put in a projection condition and a retraction condition.

According to the above configuration, the nib appearance operation can be carried out with the single clip body, and it is not required to provide a plurality of operation bodies (that is, a plurality of projections) in the barrel. Further, the clip body, which is the operation body, also serves as a clip capable of sandwiching a pocket or the like, so that the projections as the operation body can be eliminated for appearance, which increases the degree of freedom for designing the thermochromic writing instrument to enable obtaining a neat appearance.

In the thermochromic writing instrument of the present invention described above, the barrel may also include a plurality of components capable of being coupled to each other, and in this case, a portion including the rear end of the barrel may also include a rear barrel as the components and the rear end of the rear barrel may also have a configuration provided with the friction unit. That is, the barrel configuring the present thermochromic writing instrument may be one tubular body and may also be a plurality of components coupled to each other to make a tubular body.

It is preferred to configure the thermochromic writing instrument of the present invention such that a longitudinally extending slide hole is provided in a side wall of the barrel and the writing instrument further includes an appearance mechanism putting the nib of the writing body from a retraction condition into a projection condition by slide operating the clip body placed in the slide hole forward.

According to the above configuration, by slide operating the clip body forward, the nib can be put in a projection condition and in a retraction condition (appearance mechanism of so-called double knock type), so that the operation method is simple and a user can easily learn the operation method.

It is preferred to configure the thermochromic writing instrument of the present invention such that the barrel includes two or more components capable of being coupled to each other, a first or second longitudinally extending long hole having an open front or rear end is provided respectively on respective side walls of two of the components configuring the barrel, and when coupling the two components, the first and second long holes form the slide hole in communication with each other.

According to the above configuration, in a case of forming the slide hole with, for example, the first long hole opened backward and the second long hole opened forward, when coupling the two of the components configuring the barrel (that is, when forming the slide hole), an attachment portion of the clip body can easily be inserted into the slide hole via the open ends of the first and second long holes, which enables to efficiently assembly the clip body and the barrel.

It is preferred to configure the thermochromic writing instrument of the present invention such that each side wall of the two components configuring the barrel is coupled to each other so as to overlap radially with each other, and the first and second long holes form the slide hole in communication with each other in a condition radially overlapping with each other.

According to the above configuration, the first and second long holes are communicated with each other in a condition radially overlapping with each other, so that it is possible to avoid the entire barrel becoming unnecessarily long. That is, the overlapped portions of the first and second long holes do not affect the entire length of the slide hole. The "radially overlapping" configuration is described later in detail with a specific example.

It is more preferred to configure the thermochromic writing instrument of the present invention such that the clip body is assembled with the slide hole through the steps of: inserting a base portion of the clip body into the first long hole provided in one of the components configuring the barrel; and forming the slide hole by, while inserting the base portion of the clip body into the second long hole provided in another of the components configuring the barrel, coupling the other component to the one component to communicate the second long hole with the first long hole.

According to the above configuration, in addition to being enabled to easily insert the clip body into the slide hole, it becomes possible to easily carry out alignment of the first and second long holes and coupling of one component to another component using the base portion of the clip body inserted into the first long hole as a guide.

It is preferred to configure the thermochromic writing instrument of the present invention such that the writing instrument includes a cam mechanism in the barrel as the appearance mechanism, the cam mechanism includes a cam and a projection capable of alternately engaging with each other at longitudinally different positions, and by slide operating the clip body forward, the cam and the projection are alternately engaged with each other at longitudinally different positions to alternately put the nib of the writing body in the projection condition or the retraction condition.

More preferably, it may also be configured such that the barrel includes therein, as the appearance mechanism, a plurality of longitudinally extending cam teeth and cam grooves alternately placed along a circumferential direction, a rotary member having a plurality of projected ribs rotatably placed in a rear of the writing body and capable of alternately engaging with the cam teeth or the cam grooves, another plurality of cam teeth provided in the clip body and turning the rotary member, and an biasing member biasing the writing body backward, and by slide operating the clip body forward against a biasing force of the biasing member, the projected ribs are alternately engaged with the cam teeth or the cam grooves to alternately put the nib of the writing body in the projection condition or the retraction condition.

According to such configuration, utilizing the cam mechanism, an appearance mechanism of a double knock type can be configured that can put the nib in a projection condition and in a retraction condition only by slide operating the clip body forward, and thus the operation method of the present thermochromic writing instrument becomes extremely simple and a user can easily learn the operation method.

It is preferred to configure the present thermochromic writing instrument such that the clip body is stored in the barrel and having a longitudinally extending stem, and the stem and the rotary member are locked to each other in a condition having longitudinal allowance.

According to such configuration, the stem of the clip body and the rotary member are locked together in a condition having longitudinal allowance, so that a backward movement of the clip body moved forward of the slide hole is inhibited in the nib projection condition (that is, in a case of engaging the cam teeth with the projected ribs in the front). As a result, in a case of carrying out a friction operation in the nib projection condition, even when gripping near the clip body, the clip body does not move inadvertently and a stable friction operation is enabled.

It is preferred to configure the present thermochromic writing instrument such that a longitudinally extending guide groove is formed on the outer surface of the barrel forward of the slide hole, a projected bump is provided on a front inner surface of the clip body, and the bump longitudinally slides in the guide groove in association with a longitudinal movement of the clip body.

According to the above configuration, since the bump slides along the guide groove to guide the clip body longitudinally when slide operating the clip body, a lateral (circumferential) wobble of the clip body can be prevented. In addition, when the clip body sandwiches a sandwiched object, such as a pocket of clothing or a pocket book, the sandwiched object is sandwiched between the bump and the guide groove, so that the sandwiching performance of the clip body improves.

It is preferred to configure the present thermochromic writing instrument such that the friction unit is made with an elastic material, and a portion of the friction unit abuts on the clip body in a nib retraction condition.

According to the above configuration, since the clip body moved backward of the slide hole abuts on the friction unit made with an elastic material when the nib is put from the projection condition into the nib retraction condition, the impact applied to the writing body at this time can be alleviated. As a result, it is enabled to prevent a back flow of the ink in the writing body and mixing of an air from the nib.

The present thermochromic writing instrument is configured such that the friction unit is made with an elastic material and is fastened to the rear end of the barrel or a rear end of the rear barrel by press fitting, engaging, screwing, fitting, adhesion, and two color molding, or an entire of the barrel or an entire of the rear barrel is formed with the elastic material as the friction unit.

According to the above configuration, the friction unit can be fixed to the rear end of the barrel sufficiently strongly, and thus the friction unit does not move backward or fall off during a friction operation, which makes a friction operation using the friction unit stable.

A description is given below to more specific embodiments <1> through <14> of the present invention with reference to reference numerals in FIGS. 1 through 35.

<1> A thermochromic writing instrument 1 according to First Embodiment is configured with: a thermochromic ink stored inside a writing body 9; a nib 91 capable of ejecting the thermochromic ink provided at a front end of the writing body 9; a barrel 2 storing the writing body 9 longitudinally movably in a backwardly biased condition therein; and a front end hole 31 of the barrel 2 configured to allow the nib 91 of the writing body 9 to appear therefrom, wherein a longitudinally extending slide hole 21 is provided in a side wall of the barrel 2, a clip body 7 is projected radially outward from the slide hole 21, the clip body 7 is configured to become longitudinally movable along the slide hole 21, the writing instrument further includes an appearance mechanism putting the nib 91 in a projection condition from the front end hole 31 of the barrel 2 by slide operating the clip body 7 forward from a nib retraction condition, and putting the nib 91 in the retraction condition by operating the clip body 7 from the nib projection condition, and a friction unit 10 rubbing handwriting in the thermochromic ink and capable of thermally changing the color of the handwriting by frictional heat generated at that time is provided at a rear end of the barrel 2.

In the thermochromic writing instrument 1 according to First Embodiment, the friction unit 10 is provided at the rear end of the barrel 2, so that the backward movement of the friction unit 10 is inhibited during a friction operation, and thus a stable friction operation is enabled using the friction unit 10. In addition, in the thermochromic writing instrument 1 according to First Embodiment, the clip body 7 is provided with the operation unit for a nib appearance operation and the friction unit 10 is independent of the clip body 7 (operation unit), so that the clip body 7, not the friction unit 10, is operated when appearing the nib 91, and thus contamination of the friction unit 10 with hand grime and the like can be avoided. Still in addition, although the thermochromic writing instrument 1 according to First Embodiment is provided with the clip body 7 on the outer surface of the barrel 2, there are less projections compared with a thermochromic writing instrument of a conventional side sliding multi-cartridge type, and the degree of freedom for appearance design increases to allow obtaining a neat appearance.

In the present invention, the clip body 7 is capable of sandwiching a sandwiched object, such as a pocket of clothing or a pocket book, between it and the outer surface of the barrel 2. In the present invention, the friction unit 10 may have a configuration of fixing the friction unit 10 to the rear end of the barrel 2 at least during a friction operation, and the friction unit 10 may also have a configuration, for example, of appearing from the rear end of the barrel 2 by an operation other than the nib appearance operation. In the present invention, to operate the clip body 7 from the nib projection condition means an operation of releasing the nib projection condition, and may include, for example, to slide operate the clip body 7 forward, to push operate the clip body 7 radially inward, or to rotation operate the clip body 7. In the present invention, during a friction operation means the time period of friction operating using the friction unit 10. During the friction operation, it may be either in the nib projection condition or the nib retraction condition.

<2> A thermochromic writing instrument 1 according to Second Embodiment is configured such that, in the writing instrument 1 of the first invention, the appearance mechanism is a side sliding appearance mechanism using a rotary cam mechanism, includes a cam 41 formed on an inner surface of the barrel 2, a rotary member 6 engaged with the cam 41 and abutting on a rear end of the writing body 9, the clip body 7 provided with cam teeth 73a, 74a engaged with the rotary member 6, and an biasing member 8 stored in the barrel 2 and biasing the writing body 9 backward, and is a type of slide operating the clip body 7 forward for both a nib projection operation and a nib retraction operation.

The thermochromic writing instrument 1 according to Second Embodiment has the appearance mechanism of a side sliding appearance mechanism using a rotary cam mechanism and both the nib projection operation and the nib retraction operation are the type of slide operating the clip body 7 forward (appearance mechanism of so-called double knock type), and thus the operation method is simple and a user can easily learn the operation method.

<3> A thermochromic writing instrument 1 according to Third Embodiment is configured such that, in the thermochromic writing instrument 1 of the first or second invention, the barrel 2 includes a front barrel 3, an intermediate barrel 4 coupled to a rear end of the front barrel 3, and a rear barrel 5 coupled to a rear end of the intermediate barrel 4, a front end hole 31 allowing the nib 91 to appear is provided at a front end of the front barrel 3, a cam 41 is provided on an inner surface of the intermediate barrel 4, a first long hole 44 opened backward and longitudinally extending is provided at the rear end of the intermediate barrel 4, a second long hole 51 opened forward and longitudinally extending is provided with at a front end of the rear barrel 5, the rear end of the intermediate barrel 4 and the front end of the rear barrel 5 are coupled to communicate the first long hole 44 with the second long hole 51, the slide hole 21 is formed in the side wall of the barrel 2 by the first long hole 44 and the second long hole 51, and the friction unit 10 is provided at a rear end of the rear barrel 5.

The thermochromic writing instrument 1 according to Third Embodiment has the slide hole 21 formed by the first long hole 44 opened backward and the second long hole 51 opened forward, so that the clip body 7 can be inserted into the first long hole 44 and the second long hole 51 when coupling the intermediate barrel 4 and the rear barrel 5 (that is, when forming the slide hole 21) and the clip body 7 can easily be inserted into the slide hole 21, which enables easy insertion and assembly of the clip body 7 and the barrel 2.

<4> A thermochromic writing instrument 1 according to Fourth Embodiment is configured such that, in the thermochromic writing instrument 1 of the third invention, a side wall of the intermediate barrel 4 and a side wall of the rear barrel 5 are coupled to radially overlap with each other, and the first long hole 44 and the second long hole 51 are radially communicated with each other.

The thermochromic writing instrument 1 according to Fourth Embodiment has the side wall of the intermediate barrel 4 and the side wall of the rear barrel 5 coupled to each other so as to overlap radially with each other and has the first long hole 44 and the second long hole 51 so as to communicate with each other radially, so that it is possible to avoid the entire barrel 2 from becoming unnecessarily long. In the present invention, to have the side wall of the intermediate barrel 4 and the side wall of the rear barrel 5 coupled to each other so as to overlap radially with each other may include, for example, a configuration of coupling (for example, fitting or screwing) the outer surface of the side wall of the intermediate barrel 4 and the inner surface of the side wall of the rear barrel 5 so as to overlap radially, or a configuration of coupling (for example, fitting or screwing) the inner surface of the side wall of the intermediate barrel 4 and the outer surface of the side wall of the rear barrel 5 so as to overlap radially. The configuration of coupling the side wall of the intermediate barrel 4 and the side wall of the rear barrel 5 so as to overlap radially with each other may be a configuration of coupling at least a portion of the side wall of the intermediate barrel 4 and a portion of the side wall of the rear barrel 5 so as to overlap radially with each other.

<5> A thermochromic writing instrument 1 according to Fifth Embodiment is configured such that, in the thermochromic writing instrument 1 of the second, third, or fourth invention, the clip body 7 has a longitudinally extending stem 73 stored in the barrel 2, and the stem 73 and the rotary member 6 are longitudinally locked in a condition being rotatable to each other and having longitudinal allowance to each other.

In the thermochromic writing instrument 1 according to Fifth Embodiment, the clip body 7 has the longitudinally extending stem 73 stored in the barrel 2 and the stem 73 and the rotary member 6 are longitudinally locked in a condition of being rotatable to each other and having longitudinal allowance to each other, so that in the nib projection condition, the rotary member 6 is locked with the cam teeth 41a of the cam 41 and a backward movement of the rotary member 6 is inhibited and also an inadvertent longitudinal movement of the clip body 7 is suppressed. As a result, even when gripping near the clip body 7 in the nib projection condition, a stable friction operation is enabled.

<6> A thermochromic writing instrument 1 according to Sixth Embodiment is configured such that, in the thermochromic writing instrument 1 of any of the first through fifth inventions, a longitudinally extending guide groove 48 is formed on an outer surface of the barrel 2 forward of the slide hole 21, a projected bump 71a is provided on a front inner surface of the clip body 7, and the bump 71a longitudinally slides in the guide groove 48 in association with a longitudinal movement of the clip body 7.

In the thermochromic writing instrument 1 according to Sixth Embodiment, the longitudinally extending guide groove 48 is formed on the outer surface of the barrel 2 forward of the slide hole 21, the front inner surface of the clip body 7 is provided with the projected bump 71a, and in association with the longitudinal movement of the clip body 7, the bump 71a slides longitudinally in the guide groove 48, so that the sandwiching performance of the clip body improves and also a lateral (circumferential) wobble of the clip body 7 can be prevented.

<7> A thermochromic writing instrument 1 according to Seventh Embodiment is configured such that, in the thermochromic writing instrument 1 of any of the first through sixth inventions, the friction unit 10 is made with an elastic material, and a portion of the friction unit 10 abuts on the clip body 7 in the nib retraction condition.

The thermochromic writing instrument 1 according to Seventh Embodiment has the friction unit 10 made with an elastic material and has a portion of the friction unit 10 abutting on the clip body 7 in a nib retraction condition, so that the writing body 9 and the clip body 7 move backward due to the backward bias of the biasing member 8 when putting from a nib projection condition into a nib retraction condition and the clip body 7 and the friction unit 10 made with an elastic material abut on each other, and thus the impact applied to the writing body 9 at the time can be alleviated. As a result, a back flow of the ink in the writing body 9 and mixing of an air from the nib 91 can be prevented.

<8> A writing instrument 1 according to Eighth Embodiment is configured with: a writing body 9 stored in a barrel 2; an operation body provided in the barrel 2 to be operated to longitudinally move the writing body 9; and a nib 91 of the writing body 9 configured to be capable of appearing from a front end of a writing instrument 1, wherein the writing instrument further includes at least one clip body 7 as the operation body, a longitudinally extending slide hole 21 provided in a side wall of the barrel 2, and an appearance mechanism putting the nib 91 of the writing body 9 from a retraction condition into a projection condition by slide operating the clip body 7 placed in the slide hole 21 forward, and the barrel 2 includes a plurality of components capable of being coupled to each other, a first or second long hole 44, 51 longitudinally extending and opened forward or backward is provided respectively on respective side walls of two of the components configuring the barrel 2, and when coupling the two components, the first and second long holes 44, 51 form the slide hole 21 in communication with each other.

<9> A writing instrument 1 according to Ninth Embodiment is configured such that, in the writing instrument 1 according to Eighth Embodiment, each side wall of the two components configuring the barrel 2 is coupled to each other so as to overlap radially with each other, and the first and second long holes 44, 51 form the slide hole 21 in communication with each other in a condition radially overlapping with each other.

<10> A writing instrument 1 according to Tenth Embodiment is configured such that a portion including a rear end of the barrel 2 includes a rear barrel 5 as the components, and when coupling the rear barrel 5 to another of the components coupled to the rear barrel 5, the first and second long holes 44, 51 form the slide hole 21 in communication with each other.

In the writing instrument 1 according to Eighth through Tenth Embodiments, the slide hole 21 is formed with the first long hole 44 and the second long hole 51 opened forward or backward, so that the clip body 7 can easily be inserted into the slide hole 21. According to the above configuration, the first and second long holes 44, 51 are communicated with each other in a condition radially overlapping with each other, so that it is possible to avoid the entire barrel 2 becoming unnecessarily long. That is, the overlapped portions of the first and second long holes 44, 51 do not affect the entire length of the slide hole 21.

<11> A writing instrument 1 according to Eleventh Embodiment is configured with: a writing body 9 stored in a barrel 2; an operation body 7 provided in the barrel 2 to be operated to longitudinally move the writing body 9; and a nib 91 of the writing body 9 configured to be capable of appearing from a front end of a writing instrument 1, wherein the writing instrument 1 further includes a longitudinally extending slide hole 21 provided in a side wall of the barrel 2 and an appearance mechanism putting the nib 91 of the writing body 9 from a retraction condition into a projection condition by slide operating the operation body 7 placed in the slide hole 21 forward, the barrel 2 includes therein, as the appearance mechanism, a plurality of longitudinally extending cam teeth 41a and cam grooves 41b alternately placed along a circumferential direction, a rotary member 6 having a plurality of projected ribs 61 rotatably placed in a rear of the writing body 9 and capable of alternately engaging with the cam teeth 41a or the cam grooves 41b, another plurality of cam teeth 73a provided in the operation body 7 and turning the rotary member 6, and an biasing member 8 biasing the writing body 9 backward, the operation body 7 is provided with a longitudinally extending stem 73 stored in the barrel 2, and the stem 73 and the rotary member 6 are locked to each other in a condition having longitudinal allowance, and by slide operating the operation body 7 forward against a biasing force of the biasing member 8, the projected ribs 61 are alternately engaged with the cam teeth 41a or the cam grooves 41b at longitudinally different positions to alternately put the nib 91 of the writing body 9 in the projection condition or the retraction condition.

The writing instrument 1 according to Eleventh Embodiment has the appearance mechanism of a side sliding appearance mechanism using a rotary cam mechanism and both the nib projection operation and the nib retraction operation are the type of slide operating the operation body 7 forward (appearance mechanism of so-called double knock type), and thus the operation method is simple and a user can easily learn the operation method. In addition, the operation body 7 has the longitudinally extending stem 73 stored in the barrel 2 and the stem 73 and the rotary member 6 are longitudinally locked in a condition of being rotatable to each other and having longitudinal allowance to each other, so that in the nib projection condition, the rotary member 6 is locked with the cam teeth 41a of the cam 41 and a backward movement of the rotary member 6 is inhibited and also an inadvertent longitudinal movement of the operation body 7 is suppressed.

<12> A writing instrument 1 according to Twelfth Embodiment is configured such that the barrel 2 includes a plurality of components capable of being coupled to each other, a first or second long hole 44, 51 longitudinally extending and opened forward or backward is provided respectively on respective side walls of two of the components configuring the barrel 2, and when coupling the two components, the first and second long holes 44, 51 form the slide hole 21 in communication with each other.

In the writing instrument 1 according to Twelfth Embodiment, the slide hole 21 is formed with the first long hole 44 and the second long hole 51 opened forward or backward, so that the stem 73 of the clip body 7 can easily be inserted into the slide hole 21.

<13> A writing instrument 1 according to Thirteenth Embodiment is configured such that each side wall of the two components configuring the barrel 2 is coupled to overlap radially with each other, and the first and second long holes 44, 51 form the slide hole 21 in communication with each other in a condition radially overlapping with each other.

The writing instrument 1 according to Thirteenth Embodiment has the side wall of the intermediate barrel 4 and the side wall of the rear barrel 5 coupled to each other so as to overlap radially with each other and has the first long hole 44 and the second long hole 51 so as to communicate with each other radially, so that it is possible to avoid the entire barrel 2 from becoming unnecessarily long. In the present invention, to have the side wall of the intermediate barrel 4 and the side wall of the rear barrel 5 coupled to each other so as to overlap radially with each other may include, for example, a configuration of coupling (for example, fitting or screwing) the outer surface of the side wall of the intermediate barrel 4 and the inner surface of the side wall of the rear barrel 5 so as to overlap radially, or a configuration of coupling (for example, fitting or screwing) the inner surface of the side wall of the intermediate barrel 4 and the outer surface of the side wall of the rear barrel 5 so as to overlap radially. The configuration of coupling the side wall of the intermediate barrel 4 and the side wall of the rear barrel 5 so as to overlap radially with each other may be a configuration of coupling at least a portion of the side wall of the intermediate barrel 4 and a portion of the side wall of the rear barrel 5 so as to overlap radially with each other.

<14> A writing instrument 1 according to Fourteenth Embodiment is configured such that the operation body 7 is a clip body 7 having a clip main body 71 projecting from the slide hole 21.

In the writing instrument 1 of Fourteenth Embodiment although the clip body 7 is provided on the outer surface of the barrel 2, there are less projections compared with a writing instrument of a conventional side sliding multi-cartridge type, and the degree of freedom for appearance design increases to allow obtaining a neat appearance. In the present invention, the clip body 7 is capable of sandwiching a sandwiched object, such as a pocket of clothing or a pocket book, between it and the outer surface of the barrel 2.

In the present invention, the friction unit 10 may have a configuration of fixing the friction unit 10 to the rear end of the barrel 2 at least during a friction operation, and the friction unit 10 may also have a configuration, for example, of appearing from the rear end of the barrel 2 by an operation other than the nib appearance operation. In the present invention, during a friction operation means the time period of friction operating using the friction unit 10. During the friction operation, it may be either in the nib projection condition or the nib retraction condition. The ink used for the writing instrument 1 according to Eighth through Fourteenth Embodiments may be a thermochromic ink and may also be an ink other than that.

Effects of the Invention

A thermochromic writing instrument of the present invention enables a stable friction operation using a friction unit, and further can avoid contaminating the friction unit with hand grime and the like, and moreover can obtain a neat appearance with an increased degree of freedom for appearance design. A writing instrument of the present invention can easily insert a clip body into a slide hole and also can avoid the entire barrel becoming unnecessarily long.

In addition to them, a writing instrument of the present invention exhibits the following actions and effects:
(1) an operation method is simple, and a user can easily learn the operation method;
(2) an inadvertent longitudinal movement of an operation body is suppressed in a nib projection condition;
(3) an operation body can easily be inserted into a slide hole, and the entire barrel can avoid becoming unnecessarily long; and
(4) compared with a conventional writing instrument of a side sliding multi-cartridge type, there are less projections and the degree of freedom for appearance design increases, and thus a neat appearance can be obtained.

DESCRIPTION OF ILLUSTRATED EMBODIMENTS

First Embodiment

Figure 9:
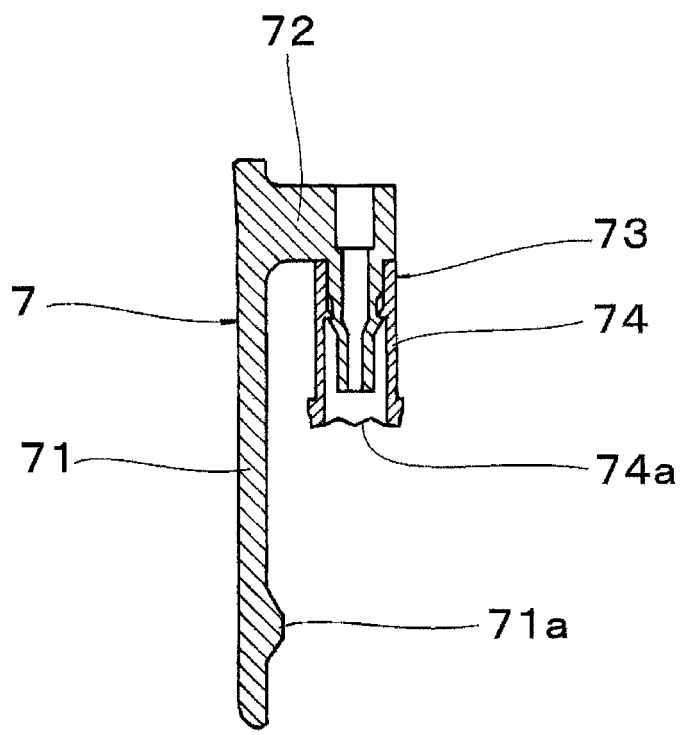
FIG. 9 is an enlarged longitudinal sectional view illustrating another embodiment of a clip body of the present invention.

FIGS. 1 and 9 illustrate an embodiment of the present invention. A thermochromic writing instrument 1 of the present embodiment is provided with a barrel 2, a writing body 9 stored in the barrel 2, an appearance mechanism enabling a nib of the writing body 9 to appear from a front end hole 31 of the barrel 2.

Writing Body

The writing body 9 includes a nib 91, an ink storage tube 92 having the nib 91 press fitted and fastened into a front end opening, a thermochromic ink filled in the ink storage tube 92, and a following body (for example, a high viscosity fluid) filled at a rear end of the thermochromic ink and also moving forward in association with consumption of the thermochromic ink.

The nib 91 may have a configuration, for example, of either consisting of a ball-point pen tip, made of metal, holding a ball rotatably at a front end or including a nib holder, made of a synthetic resin, retaining a rear outer surface of the ball-point pen tip. To a rear end opening of the ink storage tube 92, a tail plug provided with a vent allowing ventilation between the ink storage tube 92 and outside is attached. Inside the nib 91, a spring pressing the ball at a front end forward is stored. The spring has a configuration provided with a rod unit at a front end of a compression coil spring, and a front end of the rod unit makes contact with a ball rear surface. While not written, the ball closely contacts with an inner surface of an inward front end edge at a front end of the ball-point pen tip by a forward bias of the spring, and thus it is possible to prevent leakage and evaporation of the ink from the front end of the nib 91.

Barrel

The barrel 2 includes a tapered cylindrical front barrel 3, a cylindrical intermediate barrel 4 coupled to a rear end of the front barrel 3, and a cylindrical rear barrel 5 coupled to a rear end of the intermediate barrel 4.

Figure 5:
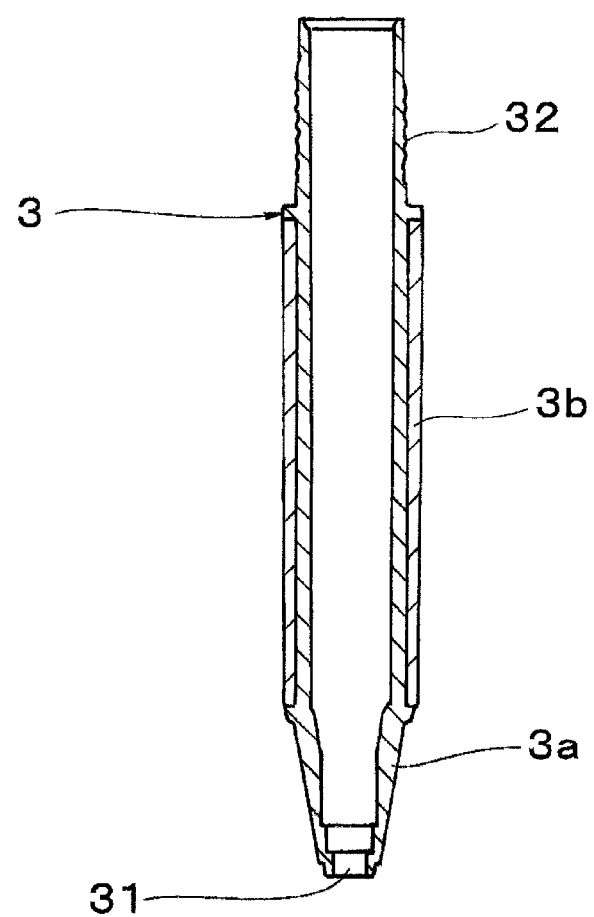
FIG. 5 is an enlarged longitudinal sectional view of a front barrel of FIG. 1.

FIG. 5 illustrates the front barrel 3. The front barrel 3 includes a tapered cylindrical main body 3a made with a molded article of a synthetic resin (for example, a polycarbonate resin) and a grip unit 3b made with an elastic material provided on an outer surface of the main body 3a. The grip unit 3b is provided by two color molding or mounting. A rear end of the front barrel 3 is reduced in diameter, and a male thread 32 is formed on its outer surface. At a front end of the front barrel 3, the front end hole 31 provided by penetrating longitudinally.

Figure 6A:
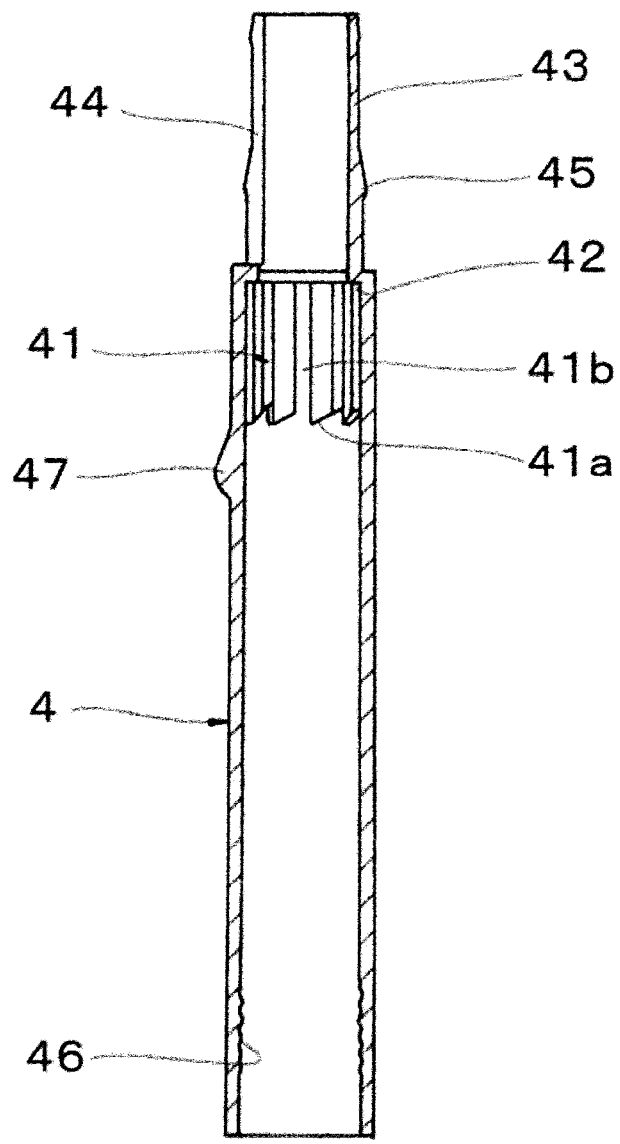
FIG. 6A is an enlarged longitudinal sectional view of an intermediate barrel of FIG. 1.
Figure 6B:
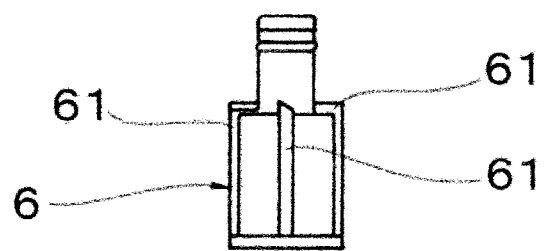
FIG. 6B is an enlarged side view of a rotary member.

FIG. 6A illustrates the intermediate barrel 4. The intermediate barrel 4 is made with a molded article of a cylindrical synthetic resin (for example, a polycarbonate resin). In an inner surface at a front end of the intermediate barrel 4, a female thread 46 is formed. The male thread 32 of the front barrel 3 can be screwed to the female thread 46. At a rear end of the intermediate barrel 4, a reduced diameter portion 43 is formed integrally. In the reduced diameter portion 43, a longitudinally extending first long hole 44 is formed that has a closed front end and an open rear end. Further, on an outer surface of the reduced diameter portion 43, an outward projection 45 is formed integrally. On an inner surface of the intermediate barrel 4 forward of the reduced diameter portion 43, a step 42 is formed integrally. On an inner surface of the intermediate barrel 4 forward of the step 42 (an inner surface forward of the first long hole 44 of the intermediate barrel 4), a cam 41 is formed integrally. The step 42 is formed integrally with the inner surface of the intermediate barrel 4 backward of the cam 41 and also forward of the first long hole 44 (that is, between the cam 41 and the first long hole 44). On an outer surface of the intermediate barrel 4, a locking projection 47 is formed integrally. In the nib retraction condition, a sandwiched object, such as a pocket, can be sandwiched between the locking projection 47 and a bump 71a of a clip body 7.

Figure 7A:
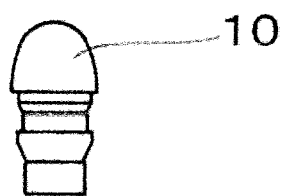
FIG. 7A is an enlarged side view of a friction unit of FIG. 1.
Figure 7B:
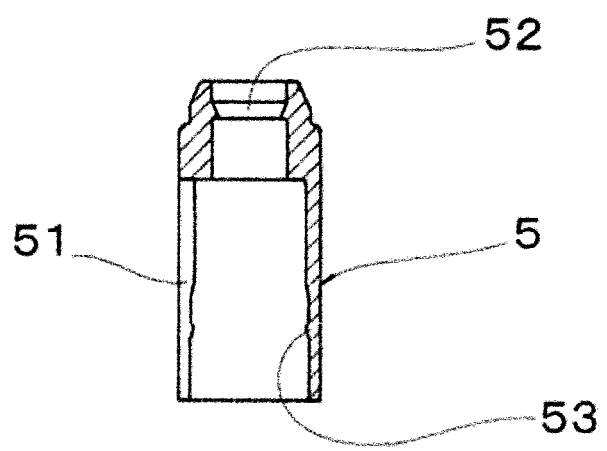
FIG. 7B is an enlarged longitudinal sectional view of a rear barrel of FIG. 1.

FIG. 7B illustrates the rear barrel 5. The rear barrel 5 is made with a molded article of a cylindrical synthetic resin (for example, a polycarbonate resin). In a side wall at a front end of the rear barrel 5, a longitudinally extending second long hole 51 is formed that has an open front end and a closed rear end. At a rear end of the rear barrel 5, an attachment hole 52 is provided by penetrating longitudinally. FIG. 7A illustrates a friction unit 10. Into the attachment hole 52, the friction unit 10 made with an elastic material is press fitted. Thus, the friction unit 10 is fixed to an outer surface at a rear end of the rear barrel 5. On an inner surface of the rear barrel 5, an inward projection 53 is formed integrally. The width dimension of the second long hole 51 is set equally to the width dimension of the first long hole 44, and thus a longitudinal smooth movement of the clip body 7 is enabled along a slide hole 21.

Figure 8:
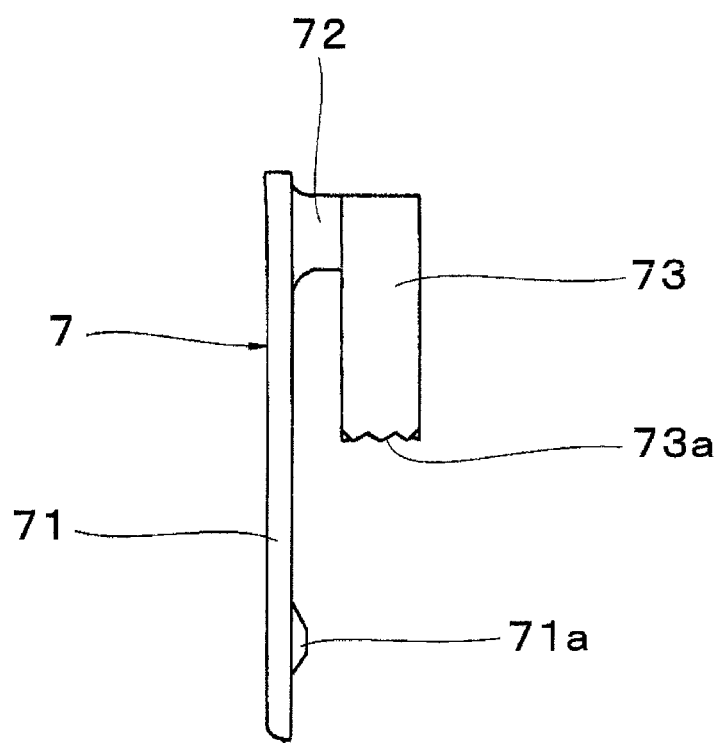
FIG. 8 is an enlarged side view of a clip body of FIG. 1.

FIG. 8 illustrates the clip body 7. The clip body 7 includes a longitudinally extending clip main body 71, a base portion 72 provided consecutively and integrally with a rear of the clip main body 71, and a stem 73 provided consecutively and integrally with the base portion 72 and extending forward of the base portion 72. The clip body 7 is obtained by a molded article of a synthetic resin (for example, a polycarbonate resin). The clip main body 71 is provided with the projected bump 71a on a backside thereof. At a front end of the stem 73, cam teeth 73a are formed integrally.

Assembly of Clip Body

A description is given to assembly of the clip body 7. From an open portion at the rear end of the first long hole 44 of the intermediate barrel 4, the base portion 72 of the clip body 7 is inserted into the first long hole 44, and also the stem 73 of the clip body 7 is inserted into the intermediate barrel 4. After that, so as to radially communicate (so as to overlap radially with each other) the first long hole 44 of the intermediate barrel 4 and the second long hole 51 of the rear barrel 5, the inner surface of the rear barrel 5 is fitted onto the outer surface of the reduced diameter portion 43 of the intermediate barrel 4 and also the base portion 72 of the clip body 7 is inserted into the second long hole 51 from an open portion at a front end of the second long hole 51. Thus, the intermediate barrel 4 and the rear barrel 5 are coupled together, and the longitudinally extending slide hole 21 is formed by the first long hole 44 and the second long hole 51, and also the clip body 7 (the clip main body 71 and a portion of the base portion 72) projects radially outward from the slide hole 21, and the clip body 7 is configured longitudinally slidably along the slide hole 21. At this time, the outward projection 45 on the outer surface of the reduced diameter portion 43 of the intermediate barrel 4 and the inward projection 53 on the inner surface of the rear barrel 5 climb over and are engaged with each other.

By coupling the rear barrel 5 having the friction unit 10 fixed thereto to the rear end of the intermediate barrel 4, the friction unit 10 is fixed to a rear end of the barrel 2 all the time. The front barrel 3 and the intermediate barrel 4 are detachably coupled by screwing, and thus the writing body 9 can be replaceable.

Appearance Mechanism

The appearance mechanism is a side sliding appearance mechanism using a rotary cam mechanism. The appearance mechanism includes the cam 41 formed on the inner surface of the intermediate barrel 4, a rotary member 6 engaged with the cam 41 and abutting on a rear end of the writing body 9, the clip body 7 engaged with the rotary member 6 and projecting radially outward from the slide hole 21, and an biasing member 8 (for example, a compression coil spring) stored in the barrel 2 and biasing the writing body 9 backward. The appearance mechanism of the present embodiment is a double knock type in which both the nib projection operation and the nib retraction operation operate by sliding forward the clip body 7. The rotary member 6 is obtained from a molded article of a synthetic resin (for example, a polyacetal resin).

The cam 41 is provided with a plurality of cam teeth 41a projecting forward in a saw blade shape and a plurality of longitudinally extending cam grooves 41b formed between the cam teeth 41a. The rotary member 6 is provided with a plurality (for example, four) of longitudinally extending projected ribs 61 on an outer surface thereof, and the projected ribs 61 are engaged with the cam teeth 41a of the cam 41 and the cam grooves 41b of the cam 41. At the front end of the stem 73 of the clip body 7, the cam teeth 73a are engaged with a rear end of the projected ribs 61 of the rotary member 6 are formed by integral molding.

Appearance of Nib

As the clip body 7 is slide operated forward from the nib retraction condition against the backward bias by the biasing member 8, the rotary member 6 is pushed forward by the cam teeth 73a of the stem 73 of the clip body 7, and in association with forward movement of the projected ribs 61 of the rotary member 6 along the cam grooves 41b, the rotary member 6 pushes the rear end of the writing body 9 forward and the nib 91 projects outside from the front end hole 31. At this time, due to the abutment of the cam teeth 73a of the stem 73 and the projected ribs 61 of the rotary member 6, the rotary member 6 rotates at a certain angle relative to the cam 41. Thus, the projected ribs 61 of the rotary member 6 are engaged with the cam teeth 41a of the cam 41 to maintain the nib projection condition.

As the clip body 7 is slide operated forward from the nib projection condition, the stem 73 of the clip body 7 pushes the rotary member 6 forward, and due to the abutment of the cam teeth 73a of the stem 73 and the projected ribs 61 of the rotary member 6, the rotary member 6 rotates at a certain angle relative to the cam 41. Thus, the engaged condition of the projected ribs 61 and the cam teeth 41a of the cam 41 is released, and due to the backward bias by the biasing member 8, the projected ribs 61 are moved backward along the cam grooves 41b of the cam 41. In association with the backward movement of the rotary member 6, the writing body 9 moves backward to be put in the nib retraction condition.

The friction unit 10 does not work together with the longitudinal movement of the clip body 7 and is fixed to an outer surface at the rear end of the rear barrel 5 (barrel 2). The friction unit 10 is provided independently of the clip body 7.

Another Example of Clip Body

FIG. 9 illustrates another embodiment of the clip body 7. The present embodiment differs from the clip body 7 of FIG. 8 in attachment of a cylindrical body 74 having cam teeth 74a to the stem 73 of the clip body 7, and other configuration, actions and effects are similar to the embodiment of FIGS. 1 through 8, so that the description is omitted. The cylindrical body 74 is obtained from a molded article of a synthetic resin (for example, a polyacetal resin).

Friction Unit

In the present embodiment, an elastic material configuring the friction unit 10 is preferably an elastic synthetic resin (rubber, elastomers), and may include, for example, a silicone resin, an SBS resin (a styrene-butadiene-styrene copolymer), an SEBS resin (a styrene-ethylene-butadiene-styrene copolymer), a fluorine-based resin, a chloroprene resin, a nitrile resin, a polyester-based resin, ethylene-propylene-diene rubber (EPDM), and the like. The elastic synthetic resin configuring the friction unit 10 is preferably made with a low wear elastic material generating almost no wear dust (erased dust) during friction, compared with those made with a high wear elastic material (for example, an eraser or the like). The friction unit 10 may be provided at least on an outer surface at a rear end of the barrel 2, and may include to have a configuration, for example, of fastening the friction unit 10 made with an elastic material to the outer surface at the rear end of the barrel 2 or to the outer surface at the rear end of the rear barrel 5 by press fitting, engagement, screwing, fitting, adhesion, two color molding, or the like, or a configuration of integrally forming the entire barrel 2 or the entire rear barrel 5 with an elastic material.

Thermochromic Ink

In the present embodiment, the thermochromic ink is preferably a reversible thermochromic ink. The reversible thermochromic ink can be configured by using various types singly or in combination, such as a heat fading type in which a color appearance condition is faded by heating, a color memory retaining type in which a color appearance condition or a faded condition is retained in memory enantiotropically in a specific temperature range, or a heat appearance type in which a color appears by heating from a faded condition and returns to the faded condition by cooling from the color appearance condition.

For a coloring material contained in the reversible thermochromic ink, reversible thermochromic pigment is preferably used that has a reversible thermochromic composition, containing at least conventionally known essential three components of: (i) an electron donating coloring organic compound; (ii) an electron accepting compound; and (iii) a reaction medium determining a temperature of occurring a coloring reaction of both above, encapsulated in microcapsules.

Figure 10:
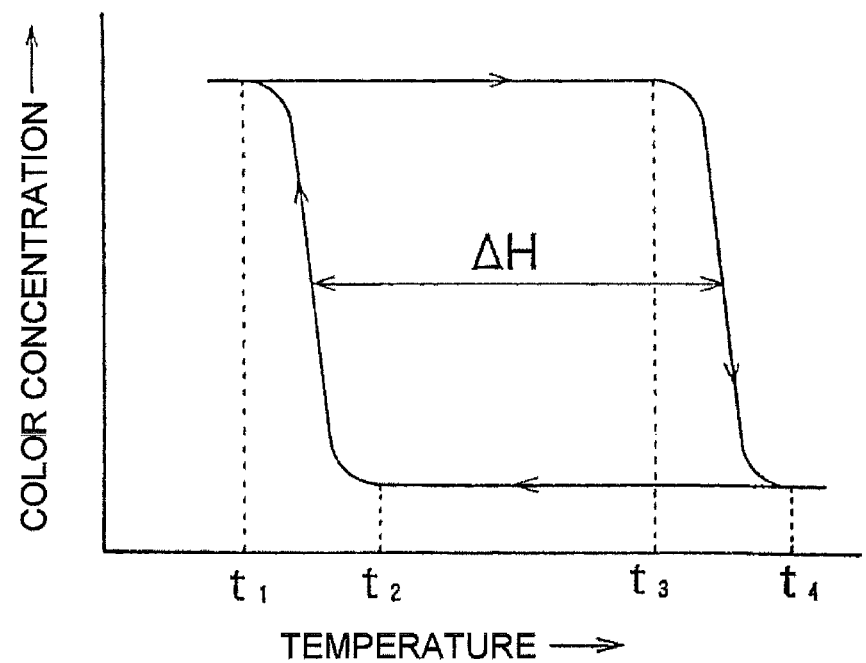
FIG. 10 is an explanatory chart illustrating discoloration behaviors of a thermochromic ink.
Figure 11:
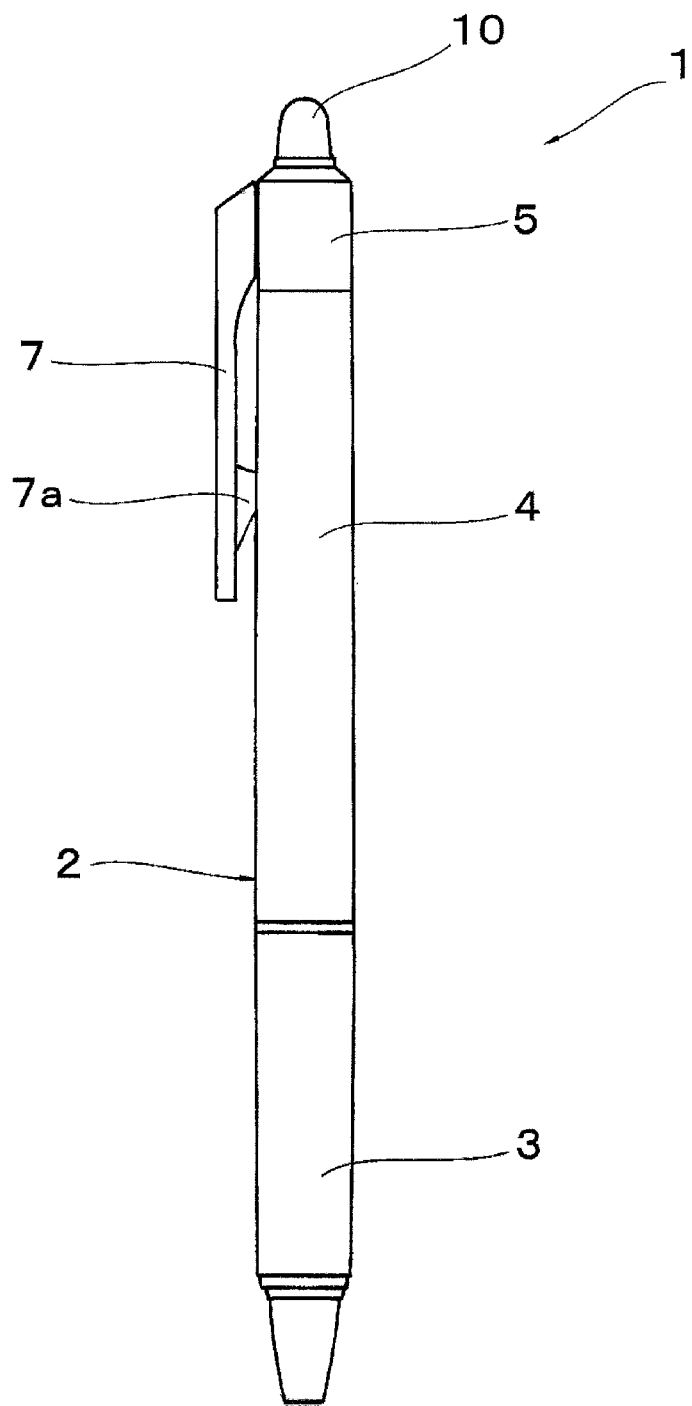
FIG. 11 is a side view illustrating a nib retraction condition in Second Embodiment of the present invention.
Figure 12:
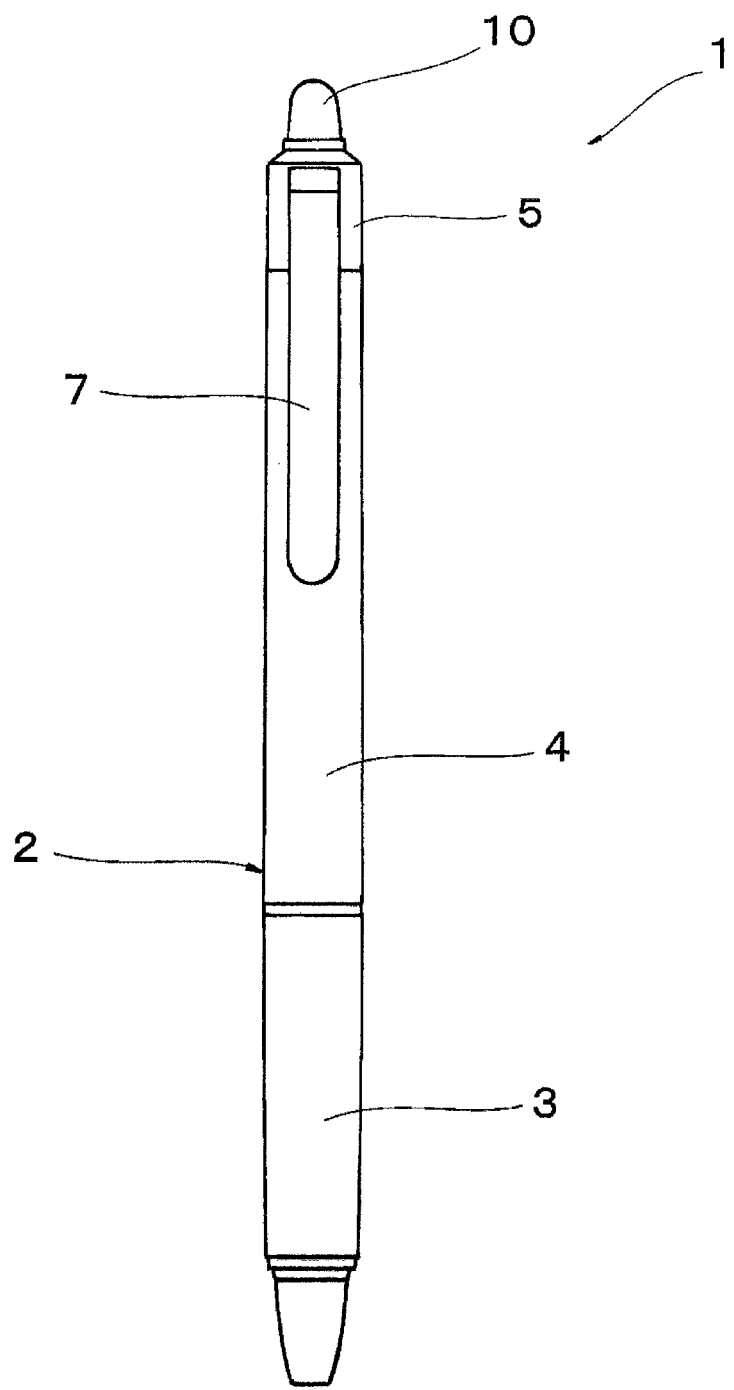
FIG. 12 is a front view of in FIG. 11.
Figure 13:
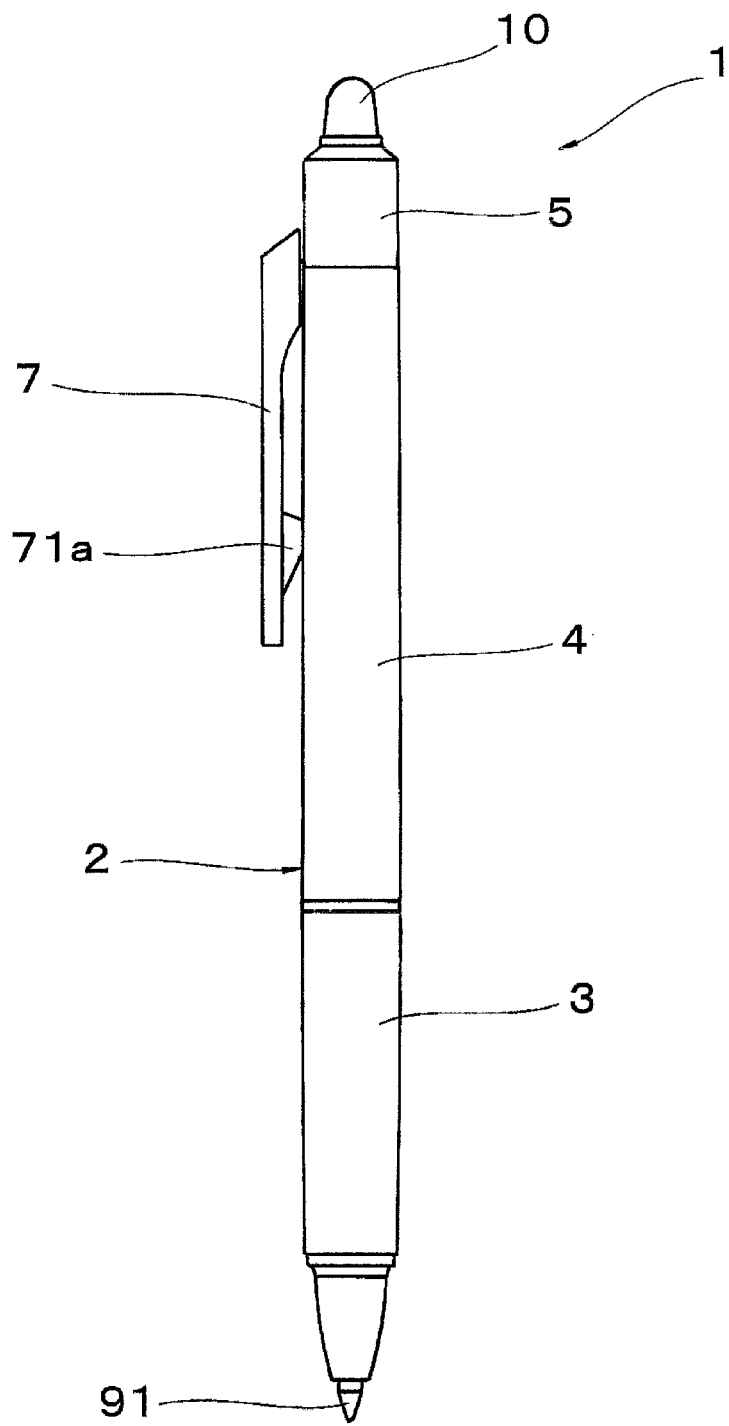
FIG. 13 is a side view illustrating a nib projection condition of FIG. 11.
Figure 14:
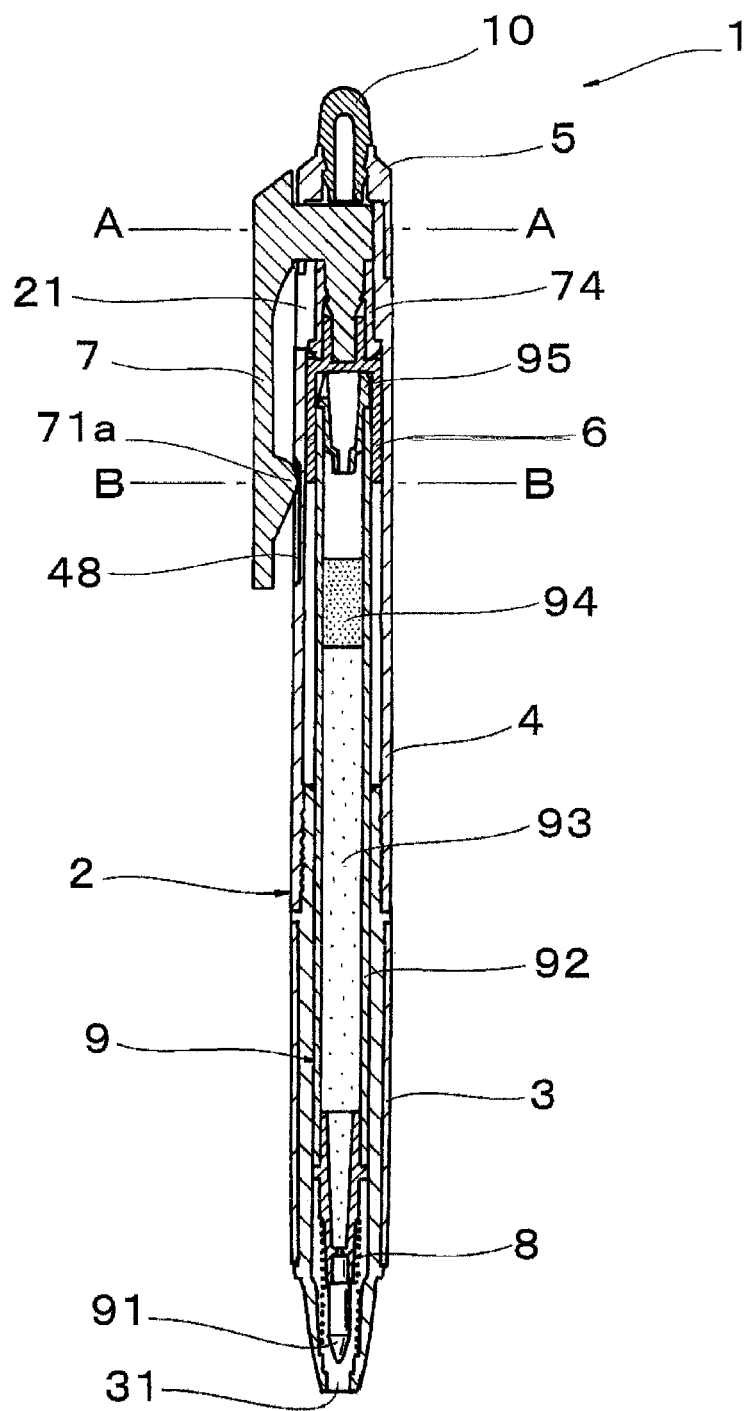
FIG. 14 is a longitudinal sectional view of FIG. 11.
Figure 15:
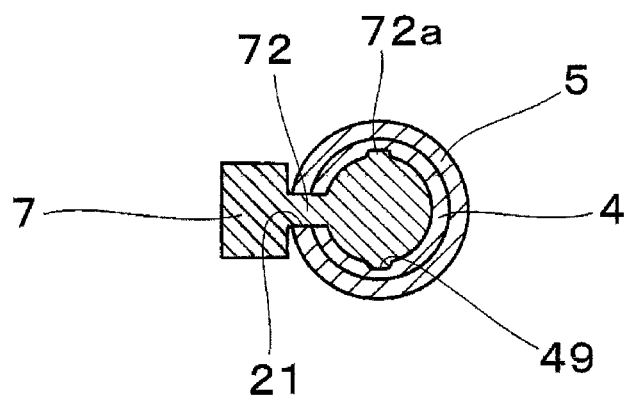
FIG. 15 is an enlarged sectional view of FIG. 14 taken on an A-A line.
Figure 16:
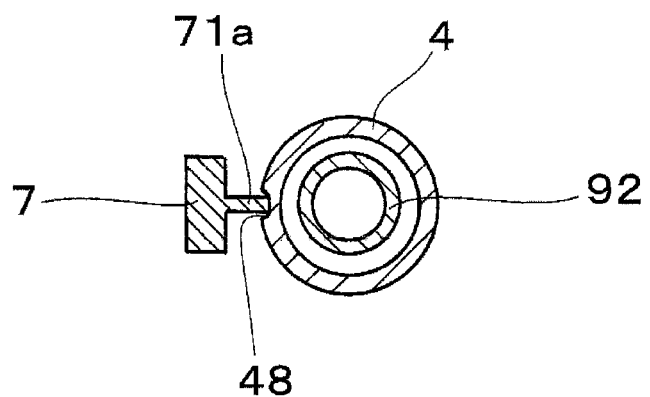
FIG. 16 is an enlarged sectional view of FIG. 14 taken on a B-B line.
Figure 17:
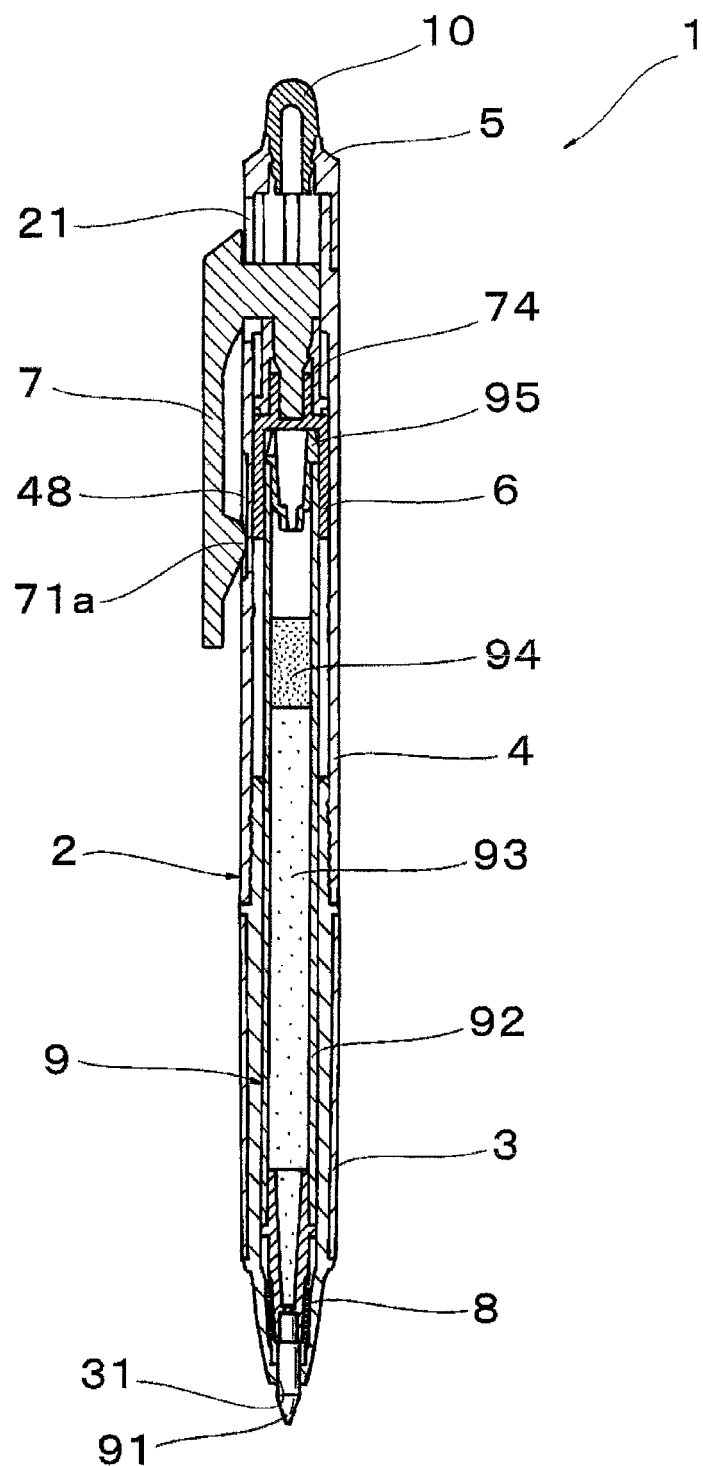
FIG. 17 is a longitudinal sectional view of the nib projection condition of FIG. 11.

In the present embodiment, as illustrated in FIG. 10, it is preferred to apply a color memory retaining thermochromic ink that is discolored as the shape of a curve having a change in coloration concentration due to a temperature change plotted thereon follows different paths between a case of raising a temperature from a side lower than a discoloration temperature range and, on the contrary, a case of lowering it from a side higher than the discoloration temperature range and that can retain, in memory, the color appearance condition in a low temperature range at a complete color appearance temperature (t1) or lower or the faded condition in a high temperature range at a complete fading temperature (t4) or higher in the specific temperature range [temperature range between t2 and t3 (substantial two phase retention temperature range)]. In FIG. 10, $\Delta H$ shows a temperature width indicating a degree of hysteresis (that is, a hysteresis width). When the value of $\Delta H$ is small, only one condition of both conditions before and after discoloration can exist. When the value of $\Delta H$ is large, retention of each condition before and after discoloration is facilitated.

In the present embodiment, a discoloration temperature of the thermochromic ink by the frictional heat of the friction unit 10 is set from 25° C. to 95° C. (preferably from 36° C. to 95° C.). That is, in the present embodiment, it is effective to set the higher temperature discoloration point [complete fading temperature (t4)] in a range from 25° C. to 95° C. (preferably from 36° C. to 90° C.) and to set the lower temperature discoloration point [complete color appearance temperature (t1)] in a range from −30° C. to +20° C. (preferably from −30° C. to +10° C.). Thus, it is enabled to effectively function retention of a color exhibited in a normal state (ordinary living temperature range) and also to easily discolor handwriting in the reversible thermochromic ink by the frictional heat of the friction unit 10.

The thermochromic writing instrument 1 of the present embodiment has the friction unit 10 fixed to the outer surface at the rear end of the barrel 2, so that the backward movement of the friction unit 10 is inhibited during a friction operation, and thus a stable friction operation is enabled using the friction unit 10. In addition, the thermochromic writing instrument 1 of the present embodiment is provided with the operation unit at the clip body 7 for a nib appearance operation and the friction unit 10 independent of the clip body 7 (operation unit), so that the clip body 7, not the friction unit 10, is operated when appearing the nib 91, and thus contamination of the friction unit 10 with hand grime and the like can be avoided. Still in addition, although the thermochromic writing instrument 1 of the present embodiment is provided with the clip body 7 on the outer surface of the barrel 2, there are less projections compared with a thermochromic writing instrument of a conventional side sliding multi-cartridge type, and the degree of freedom for appearance design increases to allow obtaining a neat appearance.

The thermochromic writing instrument 1 of the present embodiment has the appearance mechanism of a side sliding appearance mechanism using a rotary cam mechanism and both the nib projection operation and the nib retraction operation are the type of slide operating the clip body 7 forward (appearance mechanism of so-called double knock type), and thus the operation method is simple and a user can easily learn the operation method.

The thermochromic writing instrument 1 of the present embodiment has the slide hole 21 formed by the first long hole 44 opened backward and the second long hole 51 opened forward, so that the clip body 7 can be inserted into the first long hole 44 and the second long hole 51 when coupling the intermediate barrel 4 and the rear barrel 5 (that is, when forming the slide hole 21) and the clip body 7 can easily be inserted into the slide hole 21, which enables easy insertion and assembly of the clip body 7 and the barrel 2.

The thermochromic writing instrument 1 of the present embodiment has the side wall of the intermediate barrel 4 and the side wall of the rear barrel 5 coupled to each other so as to overlap radially with each other and has the first long hole 44 and the second long hole 51 so as to communicate with each other radially, so that it is possible to avoid the entire barrel 2 from becoming unnecessarily long.

The thermochromic writing instrument 1 of the present embodiment has the friction unit 10 made with an elastic material and has a portion of the friction unit 10 abutting on the clip body 7 in a nib retraction condition, so that the writing body 9 and the clip body 7 move backward due to the backward bias of the biasing member 8 when putting from a nib projection condition into a nib retraction condition and the clip body 7 and the friction unit 10 made with an elastic material abut on each other, and thus the impact applied to the writing body 9 at the time can be alleviated. As a result, a back flow of the ink in the writing body 9 and mixing of an air from the nib 91 can be prevented.

Second Embodiment

FIGS. 11 through 35 illustrate Second Embodiment of the present invention. A thermochromic writing instrument 1 of the present embodiment is provided with a barrel 2, a writing body 9 stored in the barrel 2, an appearance mechanism enabling a nib 91 of the writing body 9 to appear from a front end hole 31 of the barrel 2.

Writing Body

The writing body 9 includes a nib 91, an ink storage tube 92 having the nib 91 press fitted and fastened into a front end opening, a thermochromic ink 93 filled in the ink storage tube 92, and a following body 94 (for example, a high viscosity fluid) filled at a rear end of the thermochromic ink 93 and also moving forward in association with consumption of the thermochromic ink 93.

The nib 91 may have a configuration, for example, of either consisting of a ball-point pen tip, made of metal, holding a ball rotatably at a front end or including a nib holder, made of a synthetic resin, retaining a rear outer surface of the ball-point pen tip. To a rear end opening of the ink storage tube 92, a tail plug 95 provided with a vent allowing ventilation between the ink storage tube 92 and outside is attached. Inside the nib 91, a spring pushing the ball at a front end forward is stored. The spring has a configuration provided with a rod unit at a front end of a compression coil spring, and a front end of the rod unit makes contact with a ball rear surface. While not written, the ball closely contacts with an inner surface of an inward front end edge at a front end of the ball-point pen tip by a forward bias of the spring, and thus it is possible to prevent leakage and evaporation of the ink from the front end of the nib 91.

Barrel

The barrel 2 includes a tapered cylindrical front barrel 3, a cylindrical intermediate barrel 4 coupled to a rear end of the front barrel 3, and a cylindrical rear barrel 5 coupled to a rear end of the intermediate barrel 4.

Figure 18:
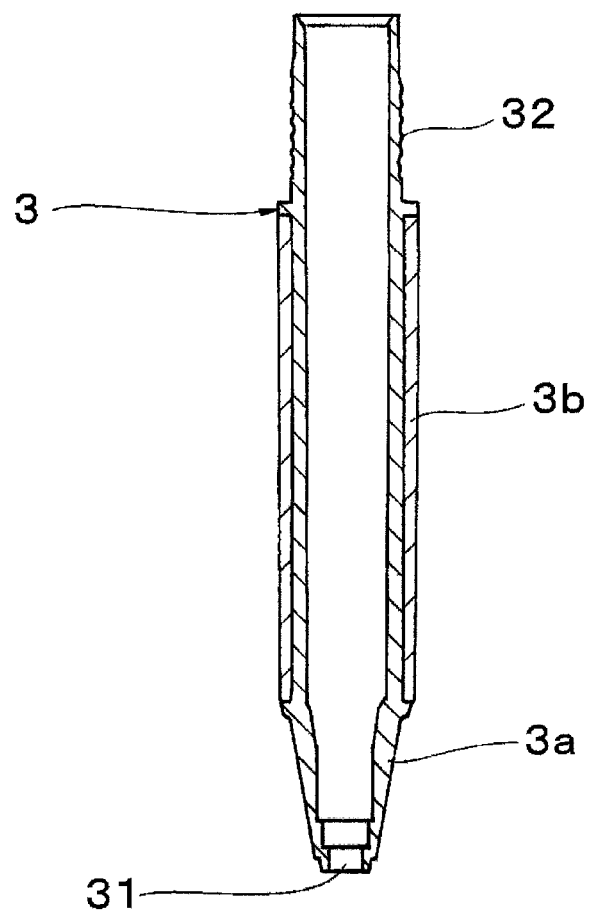
FIG. 18 is an enlarged longitudinal sectional view of a front barrel of FIG. 11.

FIG. 18 illustrates the front barrel 3. The front barrel 3 includes a tapered cylindrical main body 3a made with a molded article of a synthetic resin (for example, a polycarbonate resin) and a grip unit 3b made with an elastic material provided on an outer surface of the main body 3a. The grip unit 3b is provided by two color molding or mounting to the outer surface of the main body 3a. A rear end of the front barrel 3 is reduced in diameter, and a male thread 32 is formed on its outer surface. At a front end of the front barrel 3, the front end hole 31 provided by penetrating longitudinally.

Figure 19:
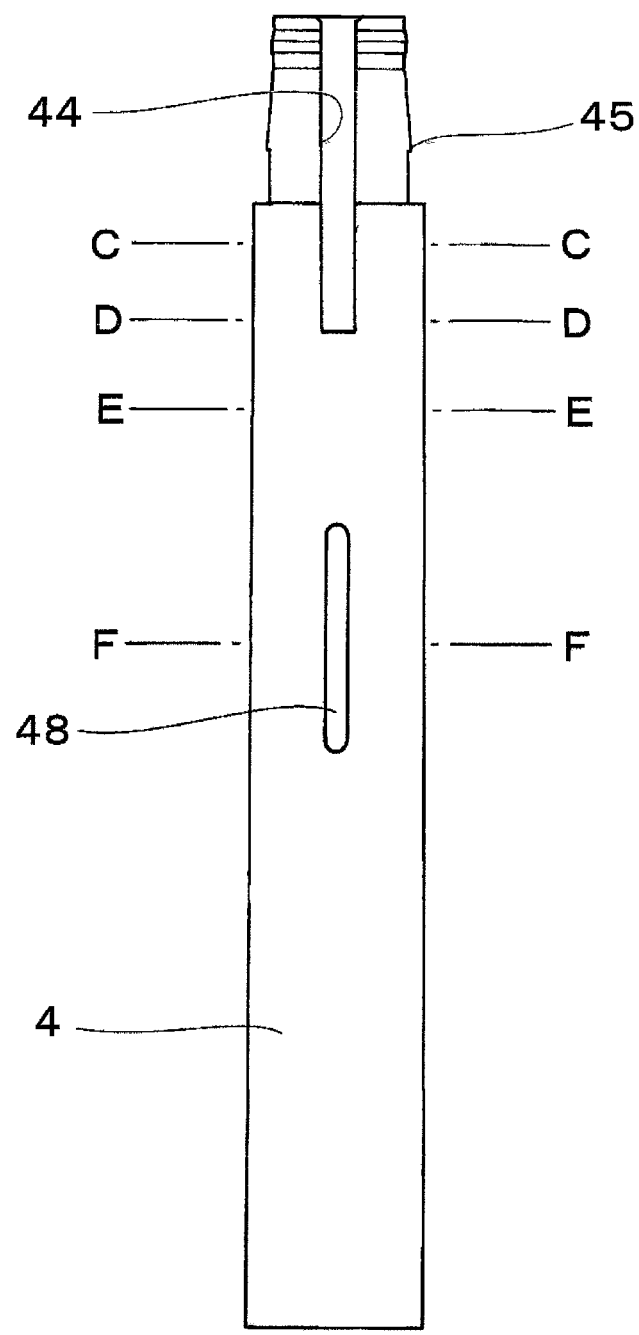
FIG. 19 is an enlarged front view of an intermediate barrel of FIG. 11.
Figure 20A:
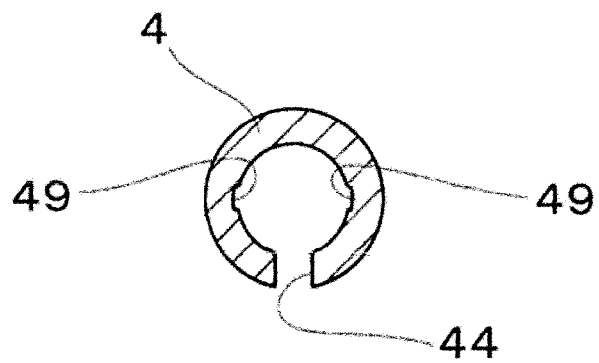
FIG. 20A is a sectional view taken on a C-C line in FIG. 19.
Figure 20B:
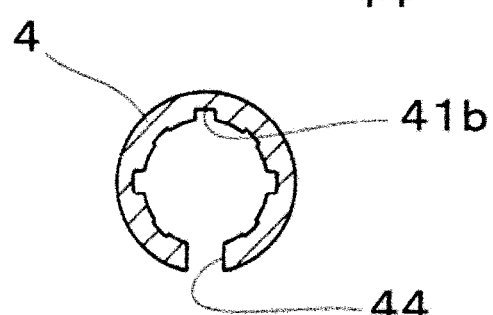
FIG. 20B is a sectional view taken on a D-D line in FIG. 19.
Figure 20C:
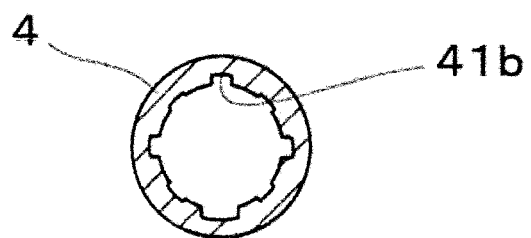
FIG. 20C is a sectional view taken on an E-E line in FIG. 19.
Figure 20D:
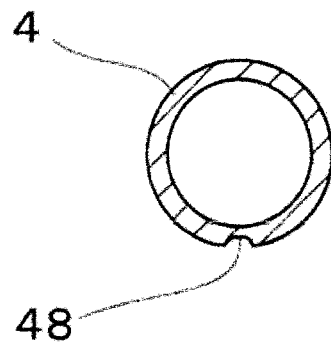
FIG. 20D is a sectional view taken on an F-F line in FIG. 19.
Figure 21:
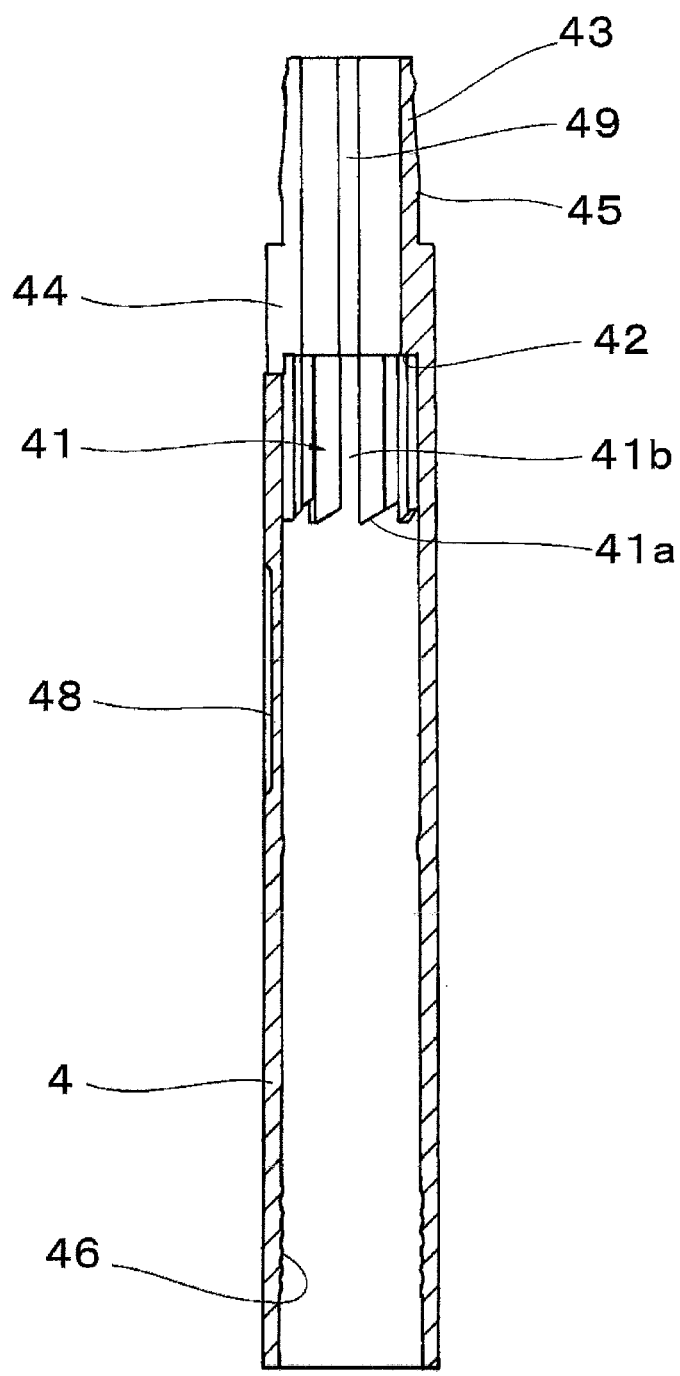
FIG. 21 is an enlarged longitudinal sectional view of the intermediate barrel of FIG. 11.
Figure 22:
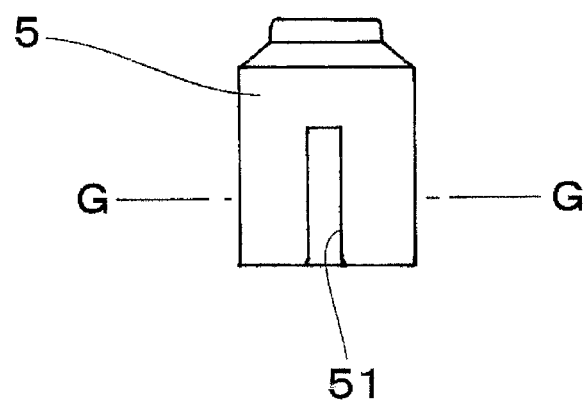
FIG. 22 is an enlarged front view of a rear barrel of FIG. 11.
Figure 23:
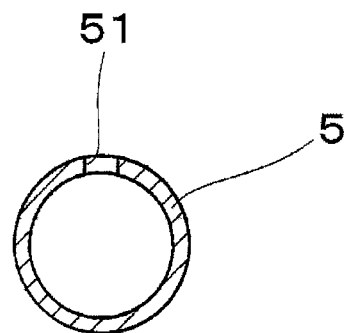
FIG. 23 is a sectional view taken on a G-G line in FIG. 22.
Figure 24:
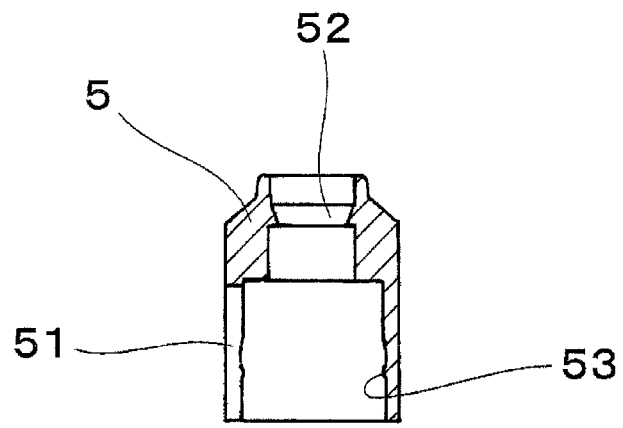
FIG. 24 is an enlarged longitudinal sectional view of the rear barrel of FIG. 11.
Figure 25:
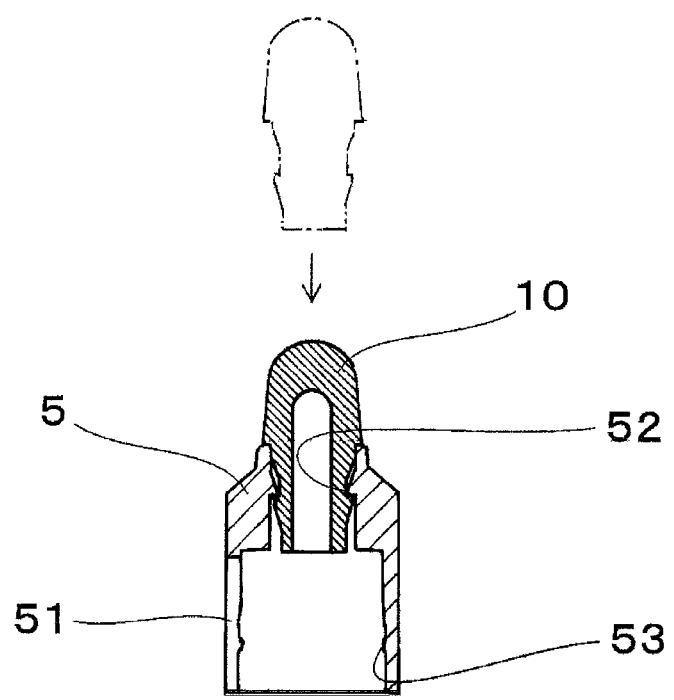
FIG. 25 is an enlarged longitudinal sectional view illustrating a condition of attaching the rear barrel and a friction unit of FIG. 11.
Figure 26:
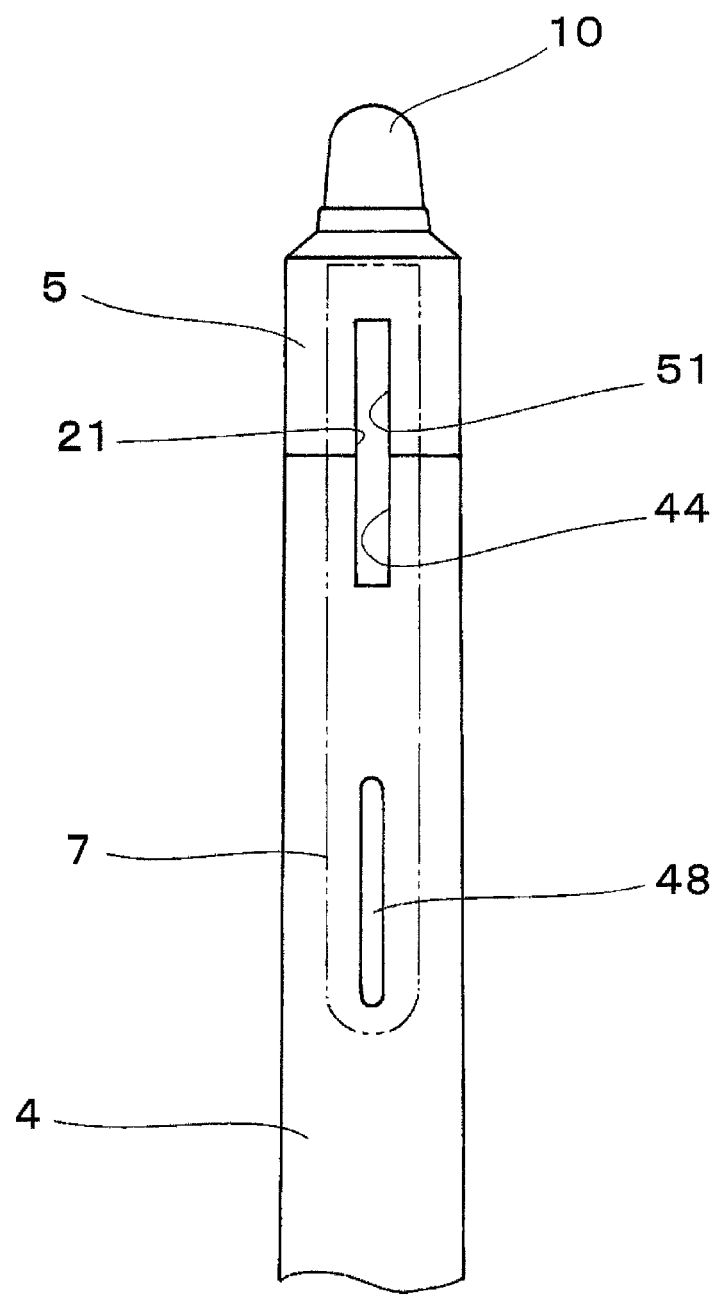
FIG. 26 is an enlarged front view of principal parts omitting a clip body of FIG. 11.

FIGS. 19 through 21 illustrate the intermediate barrel 4. The intermediate barrel 4 is made with a molded article of a cylindrical synthetic resin (for example, a polycarbonate resin). In an inner surface at a front end of the intermediate barrel 4, a female thread 46 is formed. The male thread 32 of the front barrel 3 can be screwed to the female thread 46. At a rear end of the intermediate barrel 4, a reduced diameter portion 43 is formed integrally. In a side wall at the rear end of the intermediate barrel 4, a longitudinally extending first long hole 44 is formed that has a closed front end and an open rear end. Further, on an outer surface of the reduced diameter portion 43, an outward projection 45 is formed integrally. On an inner surface of the intermediate barrel 4 forward of the reduced diameter portion 43, a step 42 is formed integrally. On an inner surface of the intermediate barrel 4 forward of the step 42, a cam 41 is formed integrally. A front end of the first long hole 44 is located slightly forward of the step (that is, a rear end of the cam 41) and also located backward of cam teeth 41a of the cam 41. In an outer surface of the intermediate barrel 4 forward of the first long hole 44, a longitudinally extending guide groove 48 is formed. With the guide groove 48, a bump 71a of the clip body 7 is engaged all the time, and in association with a longitudinal movement of the clip body 7, the bump 71a of the clip body 7 can longitudinally move along the guide groove 48. By the guide groove 48 and the bump 71a, a sandwiched object, such as a pocket, is sandwiched strongly.

FIGS. 22 through 25 illustrate the rear barrel 5. The rear barrel 5 is made with a molded article of a cylindrical synthetic resin (for example, a polycarbonate resin). In a side wall at a front end of the rear barrel 5, a longitudinally extending second long hole 51 is formed that has an open front end and a closed rear end. At a rear end of the rear barrel 5, an attachment hole 52 is provided by penetrating longitudinally. Into the attachment hole 52, a friction unit 10 made with an elastic material is press fitted. Thus, the friction unit 10 is fixed to an outer surface at a rear end of the rear barrel 5. On an inner surface of the rear barrel 5, an inward projection 53 is formed integrally. The width dimension of the second long hole 51 is set equally to the width dimension of the first long hole 44, and thus a longitudinal smooth movement of the clip body 7 is enabled along a slide hole 21.

Figure 27:
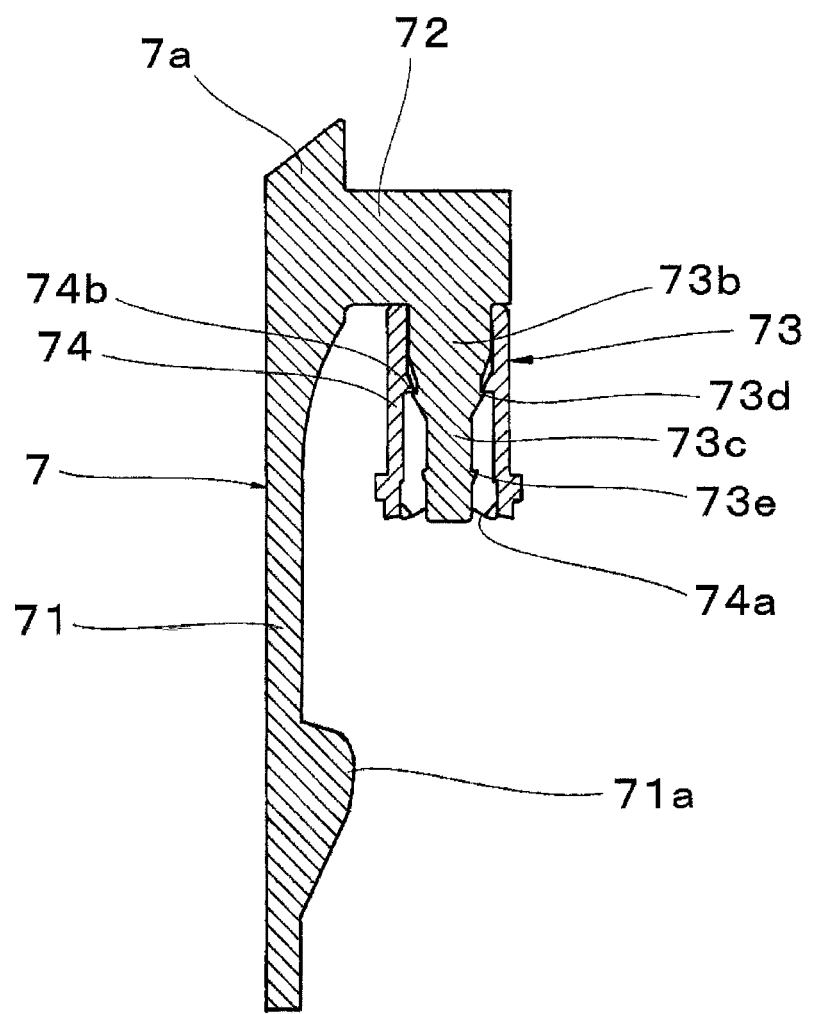
FIG. 27 is an enlarged longitudinal sectional view of the clip body of FIG. 11.
Figure 28:
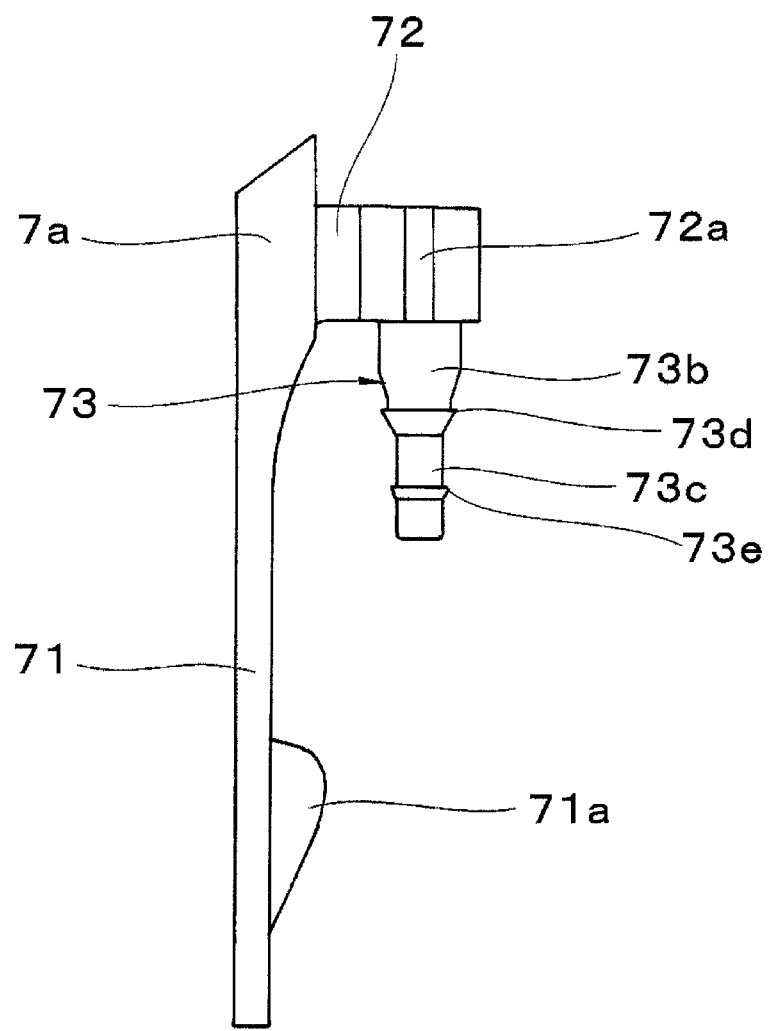
FIG. 28 is an enlarged side view of a clip body main part eliminating a cylindrical body of the clip body of FIG. 11.

FIG. 27 illustrates the clip body 7. The clip body 7 includes a main part 7a including a longitudinally extending clip main body 71, a base portion 72 provided consecutively and integrally with a rear of the clip main body 71, and a stem 73 provided consecutively and integrally with the base portion 72 and extending forward of the base portion 72, and the cylindrical body 74 attached to the stem 73. The main part 7a of the clip body 7 is obtained by a molded article of a synthetic resin (for example, a polycarbonate resin). The clip main body 71 is provided integrally with the projected bump 71a in a plate shape on a backside (inner surface) thereof.

The stem 73 includes a larger diameter portion 73b and a smaller diameter portion 73c provided consecutively forward of the larger diameter portion 73b and having an outer diameter smaller than the larger diameter portion 73b. A first outward projection 73d is formed integrally on an outer surface of the larger diameter portion 73b, and a second outward projection 73e is formed integrally on an outer surface of the smaller diameter portion 73c. The first outward projection 73d and the second outward projection 73e may include, for example, an annular projection or dispersed projections with a plurality of them dispersed in a ring.

On an outer surface of the base portion 72 of the clip body 7 or an outer surface of the stem 73, a longitudinally extending rib 72a is formed. The rib 72a is engaged with a longitudinally extending groove 49 formed on an inner surface at the rear end of the intermediate barrel 4, and the rib 72a moves longitudinally along the groove 49. Thus, a circumferential wobble of the clip body 7 can be suppressed.

Figure 29:
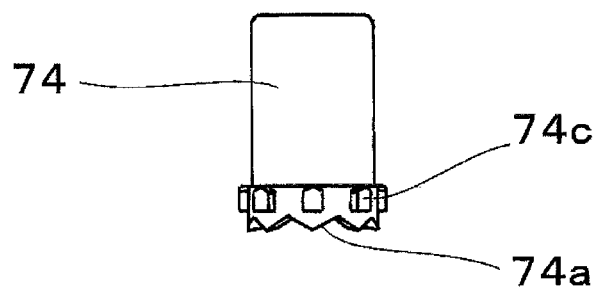
FIG. 29 is an enlarged front view of the cylindrical body of the clip body of FIG. 11.
Figure 30:
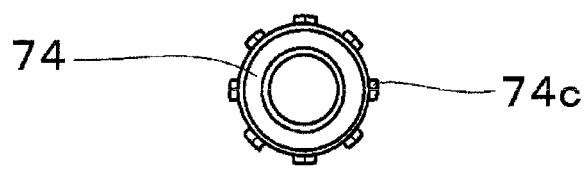
FIG. 30 is an enlarged plan view of the cylindrical body of the clip body of FIG. 11.
Figure 31:
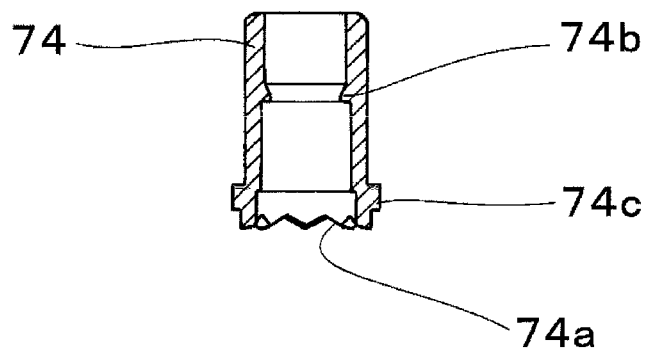
FIG. 31 is an enlarged longitudinal sectional view of the cylindrical body of the clip body of FIG. 11.

FIGS. 29 through 31 illustrate the cylindrical body 74. The cylindrical body 74 is attached to the outer surface of the stem 73 of the clip body 7. At the front end of the cylindrical body 74, the cam teeth 74a are formed. An internal hole penetrates longitudinally through inside the cylindrical body 74, and an inward projection 74b is formed integrally on an inner surface of the internal hole. The inward projection 74b climbs over and is engaged with the first outward projection 73d on the outer surface of the stem 73 of the clip body 7, and the clip body 7 and the cylindrical body 74 integrally become longitudinally movable. A plurality of guide projections 74c is formed integrally on the outer surface of the cylindrical body 74, and the guide projections 74c are engaged with the cam grooves 41b of the cam 41 longitudinally movably therealong, and thus rotation of the cylindrical body 74 in the barrel 2 is inhibited. The cylindrical body 74 is obtained from a molded article of a synthetic resin (for example, a polyacetal resin).

Figure 32:
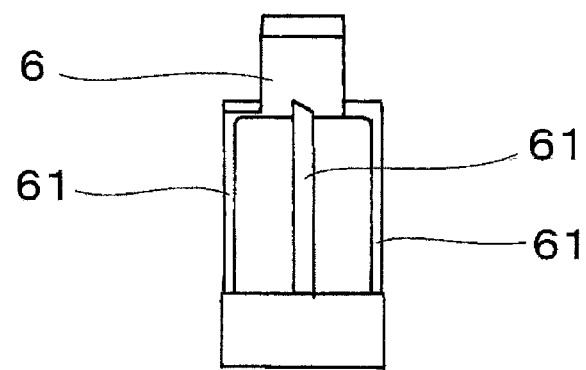
FIG. 32 is an enlarged front view of a rotary member of FIG. 11.
Figure 33:
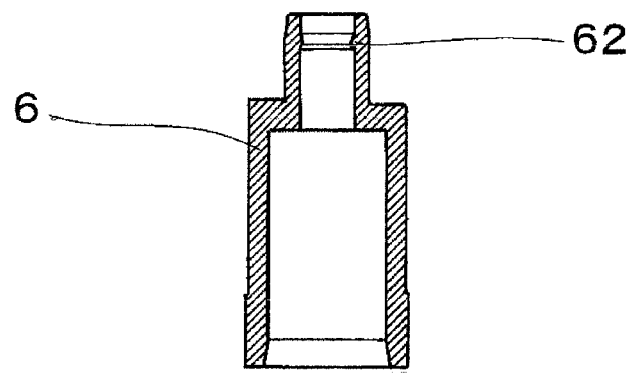
FIG. 33 is an enlarged longitudinal sectional view of the rotary member of FIG. 11.
Figure 34A:
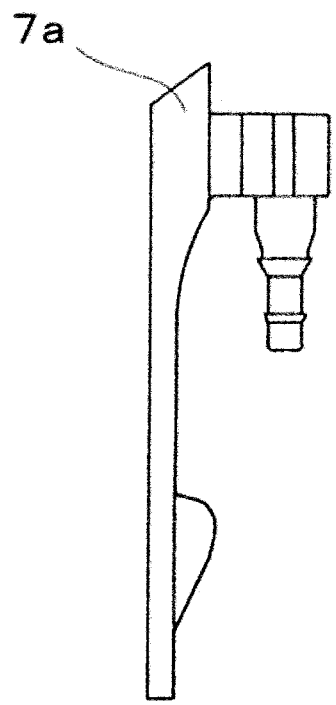
FIG. 34A is an exploded view illustrating the clip body main part of FIG. 11.
Figure 34D:
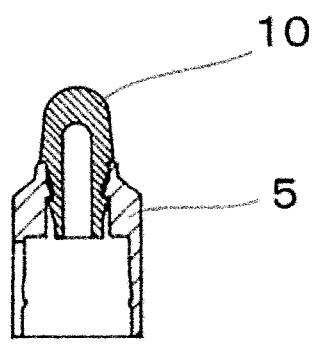
FIG. 34D is an exploded view illustrating the rear barrel of FIG. 11.
Figure 34B:
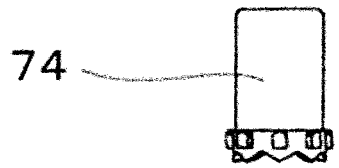
FIG. 34B is an exploded view illustrating the cylindrical body of FIG. 11.
Figure 34C:
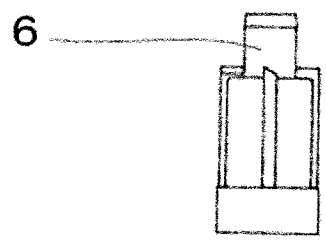
FIG. 34C is an exploded view illustrating the rotary member of FIG. 11.
Figure 34E:
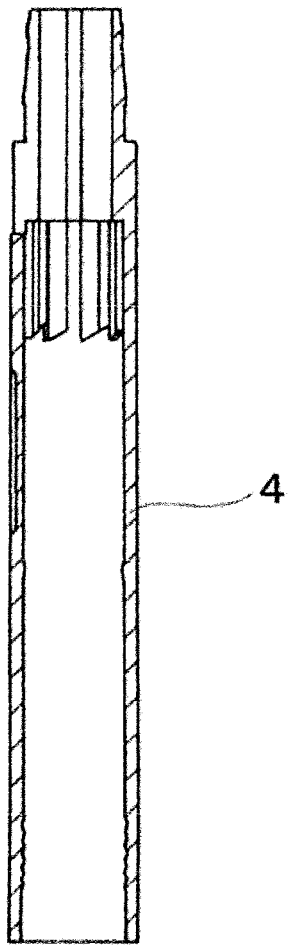
FIG. 34E is an exploded view illustrating the intermediate barrel of FIG. 11.

FIGS. 32 through 33 illustrate the rotary member 6. The rotary member 6 is provided with a plurality (for example, four) of longitudinally extending projected ribs 61 on an outer surface thereof, and the projected ribs 61 are engaged with the cam teeth 41a of the cam 41 and the cam grooves 41b of the cam 41. An internal hole is formed longitudinally penetrating through inside the rotary member 6. On an inner surface of the internal hole of the rotary member 6, an inward projection 62 is formed. The rotary member 6 is obtained from a molded article of a synthetic resin (for example, a polyacetal resin).

Figure 35:
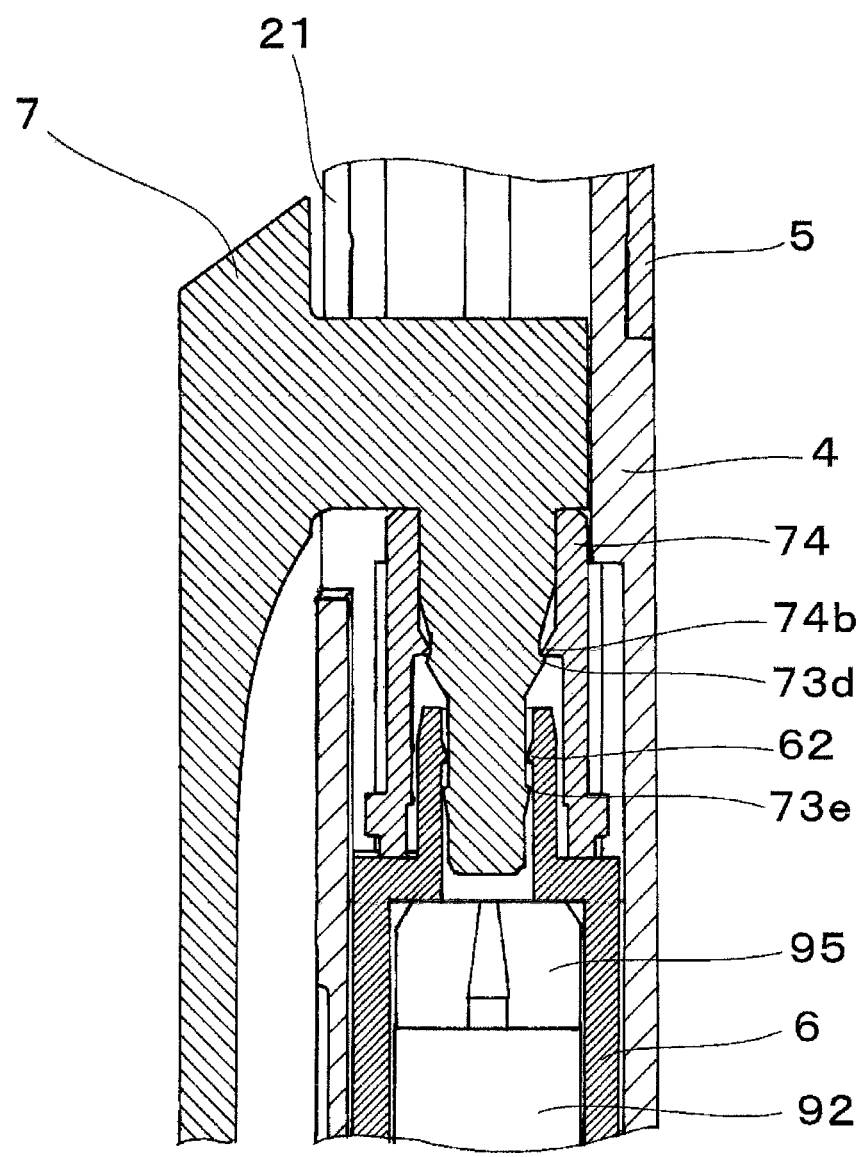
FIG. 35 is an enlarged longitudinal sectional view of principal parts in the nib projection condition (FIG. 17) of FIG. 11.

FIG. 35 illustrates an engaged condition of the clip body 7 and the rotary member 6 in a nib projection condition. The inward projection 62 of the rotary member 6 climbs over and is engaged with the second outward projection 73e of the clip body 7. Thus, the clip body 7 and the rotary member 6 are prevented from falling out. The rotary member 6 has longitudinal allowance and is also attached rotatably. The longitudinal allowance (movable amount) is set to be a small dimension to allow locking and unlocking of the projected ribs 61 of the rotary member 6 and the cam teeth 41a of the cam 41.

Assembly of Clip Body

A description is given to assembly of the clip body 7. From an open portion at the rear end of the first long hole 44 of the intermediate barrel 4, the base portion 72 of the clip body 7 is inserted into the first long hole 44, and also the stem 73 of the clip body 7 is inserted into the intermediate barrel 4. After that, so as to radially communicate (so as to overlap radially with each other) the first long hole 44 of the intermediate barrel 4 and the second long hole 51 of the rear barrel 5, the inner surface of the rear barrel 5 is fitted onto the outer surface of the reduced diameter portion 43 of the intermediate barrel 4 and also the base portion 72 of the clip body 7 is inserted into the second long hole 51 from an open portion at a front end of the second long hole 51. Thus, the intermediate barrel 4 and the rear barrel 5 are coupled together, and the longitudinally extending slide hole 21 is formed by the first long hole 44 and the second long hole 51, and also the clip body 7 (the clip main body 71 and a portion of the base portion 72) projects radially outward from the slide hole 21, and the clip body 7 is configured longitudinally slidably along the slide hole 21. At this time, the outward projection 45 on the outer surface of the reduced diameter portion 43 of the intermediate barrel 4 and the inward projection 53 on the inner surface of the rear barrel 5 climb over and are engaged with each other.

By coupling the rear barrel 5 having the friction unit 10 fixed thereto to the rear end of the intermediate barrel 4, the friction unit 10 is fixed to a rear end of the barrel 2 all the time. The front barrel 3 and the intermediate barrel 4 are detachably coupled by screwing, and thus the writing body 9 can be replaceable.

Appearance Mechanism

The appearance mechanism is a side sliding appearance mechanism using a rotary cam mechanism. The appearance mechanism includes the cam 41 formed on the inner surface of the intermediate barrel 4, a rotary member 6 engaged with the cam 41 and abutting on a rear end of the writing body 9, the clip body 7 engaged with the rotary member 6 and projecting radially outward from the slide hole 21, and an biasing member 8 (for example, a compression coil spring) stored in the barrel 2 and biasing the writing body 9 backward. The appearance mechanism of the present embodiment is a double knock type in which both the nib projection operation and the nib retraction operation operate by sliding forward the clip body 7. The rotary member 6 is obtained from a molded article of a synthetic resin (for example, a polyacetal resin).

The cam 41 is provided with a plurality of cam teeth 41a projecting forward in a saw blade shape and a plurality of longitudinally extending cam grooves 41b formed between the cam teeth 41a. The rotary member 6 is provided with the plurality (for example, four) of longitudinally extending projected ribs 61 on the outer surface thereof, and the projected ribs 61 are engaged with the cam teeth 41a of the cam 41 and the cam grooves 41b of the cam 41. At the front end of the cylindrical body 74 attached to the stem 73 of the clip body 7, the cam teeth 74a are engaged with a rear end of the projected ribs 61 of the rotary member 6 are formed integrally.

Appearance of Nib

As the clip body 7 is slide operated forward from the nib retraction condition against the backward bias by the biasing member 8, the rotary member 6 is pushed forward by the cylindrical body 74 attached to the stem 73 of the clip body 7, and in association with forward movement of the projected ribs 61 of the rotary member 6 along the cam grooves 41b, the rotary member 6 pushes the rear end of the writing body 9 forward and the nib 91 projects outside from the front end hole 31. At this time, due to the abutment of the cam teeth 74a of the cylindrical body 74 attached to the stem 73 and the projected ribs 61 of the rotary member 6, the rotary member 6 rotates at a certain angle relative to the cam 41. Thus, the projected ribs 61 of the rotary member 6 are engaged with the cam teeth 41a of the cam 41 to maintain the nib projection condition.

As the clip body 7 is slide operated forward from the nib projection condition, the cylindrical body 74 attached to the stem 73 of the clip body 7 pushes the rotary member 6 forward, and due to the abutment of the cam teeth 74a of the cylindrical body 74 and the projected ribs 61 of the rotary member 6, the rotary member 6 rotates at a certain angle relative to the cam 41. Thus, the engaged condition of the projected ribs 61 and the cam teeth 41a of the cam 41 is released, and due to the backward bias by the biasing member 8, the projected ribs 61 are moved backward along the cam grooves 41b of the cam 41. In association with the backward movement of the rotary member 6, the writing body 9 moves backward to be put in the nib retraction condition.

Friction Unit

In the present embodiment, an elastic material configuring the friction unit 10 is preferably an elastic synthetic resin (rubber, elastomers), and may include, for example, a silicone resin, an SBS resin (a styrene-butadiene-styrene copolymer), an SEBS resin (a styrene-ethylene-butylene-styrene copolymer), a fluorine-based resin, a chloroprene resin, a nitrile resin, a polyester-based resin, ethylene-propylene-diene rubber (EPDM), and the like. The elastic synthetic resin configuring the friction unit 10 is preferably made with a low wear elastic material generating almost no wear dust (erased dust) during friction, compared with those made with a high wear elastic material (for example, an eraser or the like). The friction unit 10 may be provided at least on an outer surface at a rear end of the barrel 2, and may include to have a configuration, for example, of fastening the friction unit 10 made with an elastic material to the rear end of the barrel 2 or to the rear end of the rear barrel 5 by press fitting, engagement, screwing, fitting, adhesion, two color molding, or the like, or a configuration of integrally forming the entire barrel 2 or the entire rear barrel 5 with an elastic material.

Thermochromic Ink

In the present embodiment, the thermochromic ink is preferably a reversible thermochromic ink. The reversible thermochromic ink can be configured by using various types singly or in combination, such as a heat fading type in which a color appearance condition is faded by heating, a color memory retaining type in which a color appearance condition or a faded condition is retained in memory enantiotropically in a specific temperature range, or a heat appearance type in which a color appears by heating from a faded condition and returns to the faded condition by cooling from the color appearance condition.

For a coloring material contained in the reversible thermochromic ink, reversible thermochromic pigment is preferably used that has a reversible thermochromic composition, containing at least conventionally known essential three components of: (i) an electron donating coloring organic compound; (ii) an electron accepting compound; and (iii) a reaction medium determining a temperature of occurring a coloring reaction of both above, encapsulated in microcapsules.

In the present embodiment, as illustrated in FIG. 10, it is preferred to apply a color memory retaining thermochromic ink that is discolored as the shape of a curve having a change in coloration concentration due to a temperature change plotted thereon follows different paths between a case of raising a temperature from a side lower than a discoloration temperature range and, on the contrary, a case of lowering it from a side higher than the discoloration temperature range and that can retain, in memory, the color appearance condition in a low temperature range at a complete color appearance temperature (t1) or lower or the faded condition in a high temperature range at a complete fading temperature (t4) or higher in the specific temperature range [temperature range between t2 and t3 (substantial two phase retention temperature range)]. In FIG. 10, ΔH shows a temperature width indicating a degree of hysteresis (that is, a hysteresis width). When the value of ΔH is small, only one condition of both conditions before and after discoloration can exist. When the value of ΔH is large, retention of each condition before and after discoloration is facilitated.

In the present embodiment, a discoloration temperature of the thermochromic ink by the frictional heat of the friction unit 10 is set from 25° C. to 95° C. (preferably from 36° C. to 95° C.). That is, in the present embodiment, it is effective to set the higher temperature discoloration point [complete fading temperature (t4)] in a range from 25° C. to 95° C. (preferably from 36° C. to 90° C.) and to set the lower temperature discoloration point [complete color appearance temperature (t1)] in a range from −30° C. to +20° C. (preferably from −30° C. to +10° C.). Thus, it is enabled to effectively function retention of a color exhibited in a normal state (ordinary living temperature range) and also to easily discolor handwriting in the reversible thermochromic ink by the frictional heat of the friction unit 10.

The thermochromic writing instrument 1 of the present embodiment has the friction unit 10 fixed to the outer surface at the rear end of the barrel 2, so that the backward movement of the friction unit 10 is inhibited during a friction operation, and thus a stable friction operation is enabled using the friction unit 10. In addition, the thermochromic writing instrument 1 of the present embodiment is provided with the operation unit at the clip body 7 for a nib appearance operation and the friction unit 10 independent of the clip body 7 (operation unit), so that the clip body 7, not the friction unit 10, is operated when appearing the nib 91, and thus contamination of the friction unit 10 with hand grime and the like can be avoided. Still in addition, although the thermochromic writing instrument 1 of the present embodiment is provided with the clip body 7 on the outer surface of the barrel 2, there are less projections compared with a thermochromic writing instrument of a conventional side sliding multi-cartridge type, and the degree of freedom for appearance design increases to allow obtaining a neat appearance.

The thermochromic writing instrument 1 of the present embodiment has the appearance mechanism of a side sliding appearance mechanism using a rotary cam mechanism and both the nib projection operation and the nib retraction operation are the type of slide operating the clip body 7 forward (appearance mechanism of so-called double knock type), and thus the operation method is simple and a user can easily learn the operation method.

The thermochromic writing instrument 1 of the present embodiment has the slide hole 21 formed by the first long hole 44 opened backward and the second long hole 51 opened forward, so that the clip body 7 can be inserted into the first long hole 44 and the second long hole 51 when coupling the intermediate barrel 4 and the rear barrel 5 (that is, when forming the slide hole 21) and the clip body 7 can easily be inserted into the slide hole 21, which enables easy insertion and assembly of the clip body 7 and the barrel 2.

The thermochromic writing instrument 1 of the present embodiment has the side wall of the intermediate barrel 4 and the side wall of the rear barrel 5 coupled to each other so as to overlap radially with each other and has the first long hole 44 and the second long hole 51 so as to communicate with each other radially, so that it is possible to avoid the entire barrel 2 from becoming unnecessarily long.

In the thermochromic writing instrument 1 of the present embodiment, the clip body 7 has the longitudinally extending stem 73 stored in the barrel 2 and the stem 73 and the rotary member 6 are longitudinally locked in a condition of being rotatable to each other and having longitudinal allowance to each other, so that an inadvertent longitudinal movement of the clip body 7 is suppressed in the nib projection condition. As a result, even when gripping near the clip body 7 in the nib projection condition, a stable friction operation is enabled.

In the thermochromic writing instrument 1 of the present embodiment, the longitudinally extending guide groove 48 is formed on the outer surface of the barrel 2 forward of the slide hole 21, the front inner surface of the clip body 7 is provided with the projected bump 71a, and in association with the longitudinal movement of the clip body 7, the bump 71a slides longitudinally in the guide groove 48, so that the sandwiching performance of the clip body improves and also a lateral (circumferential) wobble of the clip body 7 can be prevented.

In the thermochromic writing instrument 1 of the present embodiment, the friction unit 10 can also be made with an elastic material and a portion of the friction unit 10 can also abut on the clip body 7 in a nib retraction condition. Thus, the writing body 9 and the clip body 7 move backward due to the backward bias of the biasing member 8 when putting from a nib projection condition into a nib retraction condition and the clip body 7 and the friction unit 10 made with an elastic material abut on each other, and thus the impact applied to the writing body 9 at the time can be alleviated. As a result, a back flow and the like of the ink in the writing body 9 and mixing of an air from the nib 91 can be prevented.

DESCRIPTION OF REFERENCE NUMERALS

1: Thermochromic Writing Instrument
2: Barrel
21: Slide Hole
3: Front Barrel
31: Front End Hole
32: Male Thread
3a: Main Body
3b: Grip Unit
4: Intermediate Barrel
41: Cam
41a: Cam Teeth
41b: Cam Groove
42: Step
43: Reduced Diameter Portion
44: First Long Hole
45: Outward Projection
46: Female Thread
47: Locking Projection
48: Guide Groove
49: Groove
5: Rear Barrel
51: Second Long Hole
52: Attachment Hole
53: Inward Projection
6: Rotary Member
61: Projected Rib
62: Inward Projection
7: Clip Body
71: Clip Main Body
71a: Projected Bump
72: Base Portion
72a: Rib
73: Stem
73a: Cam Teeth
73b: Larger Diameter Portion
73c: Smaller Diameter Portion
73d: First Outward Projection
73e: Second Outward Projection
74: Cylindrical Body
74a: Cam Teeth
74b: Inward Projection
74c: Guide Projection
7a: Main Part
8: Biasing member
9: Writing Body
91: Nib
92: Ink Storage Tube
93: Thermochromic Ink
94: Following Body
95: Tail Plug
10: Friction Unit

What is claimed:

1. A thermochromic writing instrument, comprising:
a writing body, storing a thermochromic ink therein, stored in a barrel; an operation body provided in the barrel to be operated to longitudinally move the writing body;
a nib of the writing body configured to be capable of appearing from a front end of the writing instrument, wherein
the writing instrument includes a friction unit, rubbing handwriting in the thermochromic ink and capable of thermally changing the color of the handwriting by frictional heat generated at that time, and at least one clip body as the operation body, the friction unit is provided at a rear end of the barrel, and the clip body is provided in an area other than the rear end of the barrel,
the writing instrument further includes a longitudinally extending slide hole provided in a side wall of the barrel, and an appearance mechanism putting the nib of the writing body from a retraction condition into a projection condition by slide operating the clip body placed in the slide hole forward,
the barrel includes therein, as the appearance mechanism, a plurality of longitudinally extending cam teeth and cam grooves alternately placed along a circumferential direction, a rotary member having a plurality of projected ribs rotatably placed in a rear of the writing body and capable of alternately engaging with the cam teeth or the cam grooves, and a biasing member biasing the writing body backward,
by slide operating the clip body forward against a biasing force of the biasing member, the projected ribs are alternately engaged with the cam teeth or the cam grooves to alternately put the nib of the writing body in the projection condition or the retraction condition, and
the clip body includes a tubular stem, and a rear of the rotary member is inserted inside the tubular stem.

2. The thermochromic writing instrument of claim 1, wherein cam teeth are formed at a front end of the tubular stem, and the cam teeth are engaged with a rear end of the projected ribs of the rotary member.

3. The thermochromic writing instrument of claim 1, wherein the stem includes a cylindrical body, cam teeth are formed at a front end of the cylindrical body, and the cam teeth are engaged with a rear end of the projected ribs of the rotary.

4. The thermochromic writing instrument of claim 3, wherein a plurality of guide projections are formed on an outer surface of the cylindrical body, and the guide projections are engaged with the cam grooves longitudinally movably therealong.

* * * * *